US006707823B1

(12) United States Patent
Miyao

(10) Patent No.: US 6,707,823 B1
(45) Date of Patent: Mar. 16, 2004

(54) NETWORK DESIGNING METHOD AND RECORDING MEDIUM ON WHICH THE CONTROL PROGRAM IS RECORDED

(75) Inventor: Yasuhiro Miyao, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/339,654

(22) Filed: Jun. 24, 1999

(30) Foreign Application Priority Data

Jun. 26, 1998 (JP) .......................................... 10-179919

(51) Int. Cl.[7] .............................................. H04L 12/46
(52) U.S. Cl. ........................ 370/406; 370/404; 370/248
(58) Field of Search ................................. 370/360, 367, 370/386–388, 400–408, 221–248; 359/115, 117–119; 709/249, 251; 379/219, 221.06, 221.07, 225, 226

(56) References Cited

U.S. PATENT DOCUMENTS

| | | | | |
|---|---|---|---|---|
| 5,515,367 A | * | 5/1996 | Cox, Jr. et al. | ............. 370/404 |
| 5,546,542 A | * | 8/1996 | Cosares et al. | ............. 709/241 |
| 5,657,142 A | * | 8/1997 | Fahim | ......................... 359/110 |
| 5,812,532 A | * | 9/1998 | Oki et al. | ....................... 370/255 |
| 5,986,783 A | * | 11/1999 | Sharma et al. | .............. 359/119 |
| 6,038,044 A | * | 3/2000 | Fee et al. | ..................... 359/119 |
| 6,046,833 A | * | 4/2000 | Sharma et al. | .............. 359/119 |
| 6,047,331 A | * | 4/2000 | Medard et al. | ............. 709/239 |
| 6,229,815 B1 | * | 5/2001 | Huang et al. | ................. 370/437 |
| 6,233,221 B1 | * | 5/2001 | Lowe et al. | ................. 370/222 |
| 6,304,349 B1 | * | 10/2001 | Alanyali et al. | ............. 359/127 |
| 6,389,015 B1 | * | 5/2002 | Huang et al. | ................. 370/376 |
| 6,396,852 B1 | * | 5/2002 | Simmons | .................... 370/535 |
| 6,421,349 B1 | * | 7/2002 | Grover | ....................... 370/408 |

OTHER PUBLICATIONS

S. Bortolon, H. M. F. Tavares, and R. V. Ribeiro, "A Methodology to SDH Networks Design Using Optimization Tools", IEEE 1996, pp. 1867–1871.*

R. Doverspike, J. A. Morgan, and W. Leland, "Network Design Sensitivity Studies for Use of Digital Cross–Connect systems in Survivable Network Architectures", IEEE Jan. 1994, vol. 12, pp. 69–78.*

S. S. Wagner, and T. E. Chapuran, "Multiwavelength Ring Networks for Switch Consolidation and Interconnection", IEEE 1992 pp. 1173–1179.*

D. K. Kim, S. J. Lee, D. W. Choi, and D. K. Sung, "An Architecture of Broadband Personal Communication Network", IEEE 1996, pp. 603–607.*

J. J. Lee, and K. Y. Jung, "An Algorithm for determining the Feasibility of SONET/ATM Rings in Broadband Networks", IEEE 1995, pp. 356–360.*

T. Eilam, S. Moran, and S. Zaks, "Lightpath Arrangement in Survivable Rings to Minimize the Switching Cost", IEEE Jan. 2002, vol. 20, pp. 172–182.*

P. Arijs, R. Meersman, W. V. Parys, E. Iannone, A. Tanzi, M. Pierpaoli, F. Bentivogio, and P. Demeester, "Architecture and Design of Optical Channel Protected Ring Networks", IEEE Jan. 2001, vol. 19, pp. 11–21.*

* cited by examiner

Primary Examiner—Chi Pham
Assistant Examiner—Thai D Hoang
(74) Attorney, Agent, or Firm—Dickstein, Shapiro, Morin & Oshinsky, LLP.

(57) ABSTRACT

A network designing method is provided that decides the slot allocation in a bi-directional ring system through which paths are routed, at minimum total costs for ring systems and for cross connect (XC) connecting them. Routes for a ring candidate and a node base path candidate are created based on connection information regarding nodes and spans and based on demand pairs and hubs (step A1). Thus, an integer programming problem is created and solved (step A2). The solved results are used to decide the number of ring candidates to be installed in bi- and uni-directional ring systems, nodes to which ADMs are installed in each ring system, node base path capacities, and slot numbers allocated to channels routing a bi-directional ring system (step A3).

8 Claims, 20 Drawing Sheets

FIG.2

| ITEM NUMBER | CONSTANT | DEFINITION |
|---|---|---|
| 1 | $a_s$ | COSTS OF SPAN s |
| 2 | $r^{BADM/UADM}$ | COSTS PER ADM FOR BI-/UNI-DIRECTIONAL RING SYSTEM |
| 3 | $r^{XC}$ | COSTS PER XC |
| 4 | $D$ | MAXIMUM NUMBER OF FIBERS INSTALLABLE OVER EACH SPAN |
| 5 | $E^{XC}$ | MAXIMUM NUMBER OF XCS INSTALLABLE OVER EACH NODE |
| 6 | $K^{B/U}$ | MAXIMUM NUMBER OF BI-/UNI-DIRECTIONAL RING SYSTEMS INSTALLABLE OVER EACH RING |
| 7 | $\mu^{XC}$ | NUMBER OF PORTS PER XC |
| 8 | $T^{XC}$ | MAXIMUM VALUE OF TOTAL NUMBER OF XCS INSTALLABLE OVER WHOLE NETWORK |
| 9 | $T^{BADM/UADM}$ | MAXIMUM VALUE OF TOTAL NUMBER OF ADMS IN BI-/UNI-DIRECTIONAL RING SYSTEM INSTALLABLE OVER WHOLE NETWORK |

FIG.3

| ITEM NUMBER | INDICATOR | DEFINITION |
|---|---|---|
| 1 | $o_r^n$ | 1 IS SET WHEN RING r CONTAINS, 0 IS SET WHEN RING r DOES NOT CONTAIN NODE n |
| 2 | $\delta_{k(lp)}^{n,m}$ | 1 IS SET WHEN h-TH HOP OF NODE BASE PATH lp CORRESPONDS TO n AND WHEN h+1 HOP THEREOF CORRESPONDS TO m 0 IS SET WHEN h-TH HOP OF NODE BASE PATH lp DOES NOT CORRESPOND TO n AND WHEN h+1 HOP THEREOF DOES NOT CORRESPOND TO m |
| 3 | $g_{lp}^n$ | 1 IS SET WHEN NODE BASE PATH lp GOES THROUGH NODE n 0 IS SET WHEN NODE BASE PATH lp DOES NOT GO THROUGH NODE n |
| 4 | $g_{r,n,m}^{cw/ct,s}$ | 1 IS SET WHEN PATH IN CLOCKWISE/COUNTERCLOCKWISE DIRECTION BETWEEN NODES n AND m ON RING r CONTAINS SPAN s 0 IS SET WHEN PATH IN CLOCKWISE/COUNTERCLOCKWISE DIRECTION BETWEEN NODES n AND m ON RING r DOES NOT CONTAIN SPAN s |

FIG.4

| ITEM NUMBER | VARIABLE | DEFINITION |
|---|---|---|
| 1 | $c_{lp}$ | CAPACITY ALLOCATED TO NODE BASE PATH lp |
| 2 | $u_{r,n,m}^{k,w,cw/ct}$ | 1 IS SET WHEN CHANNEL WITH SLOT NUMBER w GOES ALONG PATH E IN CLOCKWISE/COUNTERCLOCKWISE DIRECTION BETWEEN NODES n AND m IN k-TH BI-DIRECTIONAL RING SYSTEM ON RING r<br>0 IS SET WHEN CHANNEL WITH SLOT NUMBER w DOES NOT GO ALONG PATH E IN CLOCKWISE/COUNTERCLOCKWISE DIRECTION BETWEEN NODES n AND m IN k-TH BI-DIRECTIONAL RING SYSTEM ON RING r |
| 3 | $b_{r,n,m}^{k}$ | NUMBER OF CHANNELS TO BE ROUTED BETWEEN NODES n AND m IN k-TH UNI-DIRECTIONAL RING SYSTEM INSTALLED ON RING r |
| 4 | $f_{r,k,n}^{B/U}$ | 1 IS SET WHEN k-TH BI-/UNI-DIRECTIONAL RING SYSTEM IS INSTALLED TO RING r<br>0 IS SET WHEN k-TH BI-/UNI-DIRECTIONAL RING SYSTEM IS NOT INSTALLED TO RING r |
| 5 | $d_{r,k}^{B/U}$ | 1 IS SET WHEN k-TH BI-/UNI-DIRECTIONAL RING SYSTEM IS INSTALLED TO RING r<br>0 IS SET WHEN k-TH BI-/UNI-DIRECTIONAL RING SYSTEM IS NOT INSTALLED TO RING r |
| 6 | $e_{n}^{XC}$ | NUMBER OF XCs TO BE SET TO NODE n BEING HUB |

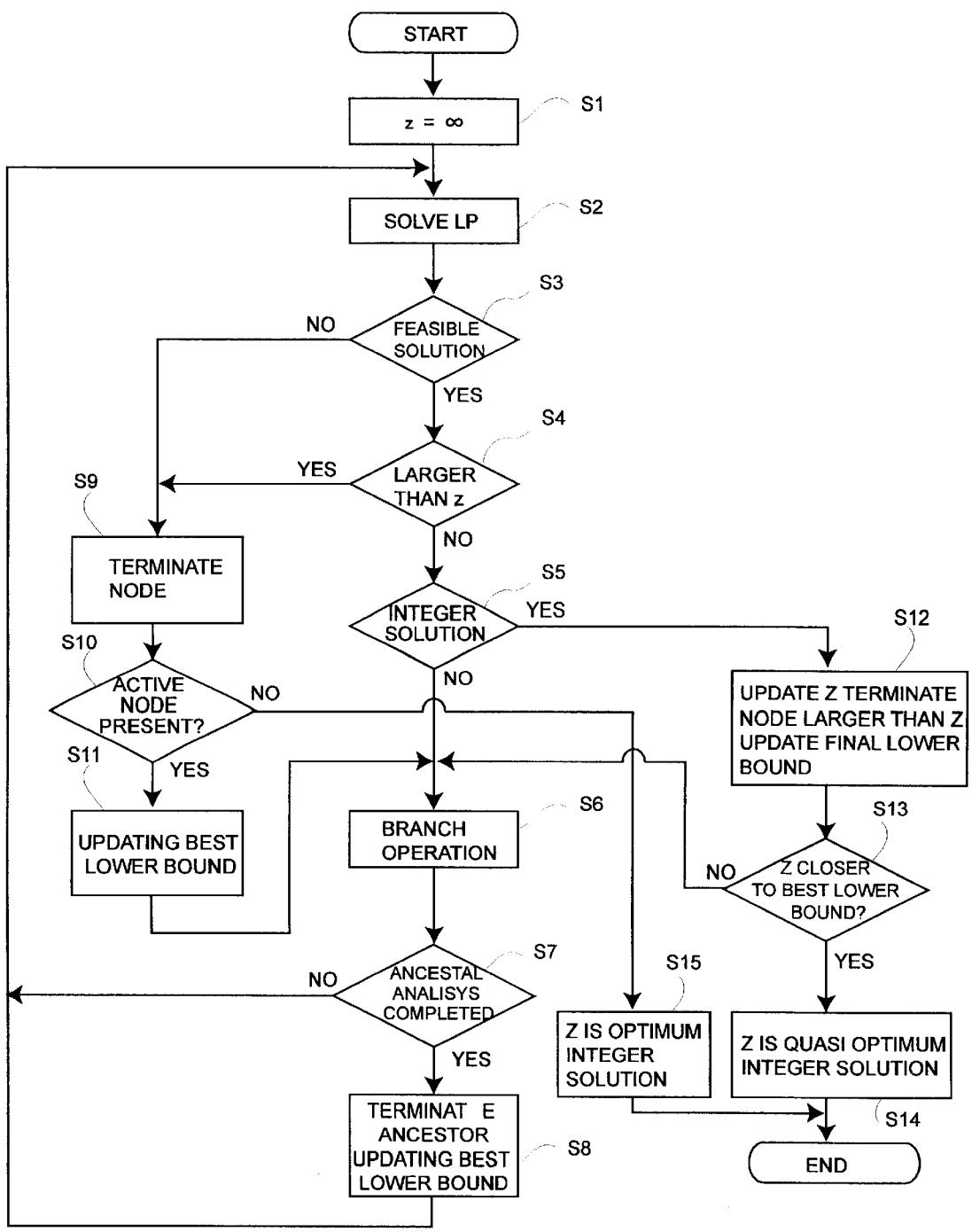

FIG.6

| ITEM NUMBER | VARIABLE | DEFINITION |
|---|---|---|
| 1 | $c_{lp}^{w}$ | CAPACITY ALLOCATED TO PATH lp WITH SLOT NUMBER w |
| 2 | $b_{r,n,m}^{k,w}$ | INDICATOR 1 IS SET WHEN CHANNEL ALLOACTED WITH SLOT NUMBER w GOES BETWEEN NODES n AND m IN k-TH UNI-DIRECTIONAL RING SYSTEM INSTALLED TO r-TH RING CANDIDATE INDICATOR 0 IS SET WHEN CHANNEL ALLOACTED WITH SLOT NUMBER w DOES NOT GO BETWEEN NODES n AND m IN k-TH UNI-DIRECTIONAL RING SYSTEM INSTALLED TO r-TH RING CANDIDATE |

FIG.8

| ITEM NUMBER | SYMBOLS | DEFINITION |
|---|---|---|
| 1 | $N_p$ | COLLECTION OF HUBS CONTAINED AS TRANSIT NODE ON AT LEAST ONE PATH ROUTE OF DEMAND PAIR p |
| 2 | $\pi_{lp}^{n}$ | 1 WHEN PATH lp CONTAINS HUB n ACTING AS TRANSIT NODE, 0 WHEN PATH lp DOES NOT CONTAIN HUB n ACTING AS TRANSIT NODE |

FIG.18  PRIOR ART

| ITEM NUMBER | CONSTANT | DEFINITION |
|---|---|---|
| 1 | $a_r^B$ | COSTS WHEN ONE BI-DIRECTIONAL SYSTEM IS INSTALLED TO RING r |
| 2 | $a_r^U$ | COSTS WHEN ONE UNI-DIRECTIONAL SYSTEM IS INSTALLED TO RING r |
| 3 | $v_p$ | DEMAND AMOUNT OF DEMAND PAIR p |
| 4 | $\Omega$ | TOTAL NUMBER OF SLOTS PER FIBER |
| 5 | $g_{lp}^s$ | INDICATOR HAS 1 WHEN PATH lp ACTING AS SPAN BASE PATH IS ROUTED OVER SPAN s INDICATOR HAS 0 WHEN PATH lp ACTING AS SPAN BASE PATH IS NOT ROUTED OVER SPAN s |
| 6 | $g_r^s$ | INDICATOR HAS 1 WHEN RING r CONTAINS SPAN s, INDICATOR HAS 0 WHEN RING r DOES NOT CONTAIN SPAN s |
| 7 | $g_{lp}^r$ | INDICATOR HAS 0 WHEN PATH lp ACTING AS RING BASE PATH IS ROUTED OVER RING r INDICATOR HAS 1 WHEN PATH lp ACTING AS RING BASE PATH IS NOT ROUTED OVER RING r |

FIG.19     PRIOR ART

| ITEM NUMBER | VARIABLES | DEFINITION |
|---|---|---|
| 1 | $C_{lp}$ | CAPACITY ALLOCATED TO PATH lp |
| 2 | $d_r^B$ | NUMBER OF BI-DIRECTIONAL RING SYSTEMS TO BE INSTALLED TO RING r |
| 3 | $d_r^U$ | NUMBER OF UNI-DIRECTIONAL RING SYSTEMS TO BE INSTALLED TO RING r |

NETWORK DESIGNING METHOD AND RECORDING MEDIUM ON WHICH THE CONTROL PROGRAM IS RECORDED

BACKGROUND OF THE INVENTION

The present invention relates to a network designing method and to a recording medium on which the control program is recorded. Particularly, the present invention is to provide a method of designing an inter-ring connection network with a fault-recoverable feature.

Ring systems have been used in order to secure communications by quickly using an alternate line when a failure occurs in a communication system (refer to, Tsong-Ho wu, Fiber Network Survivability, 1992, Artech House). FIG. 10 illustrates the topology of a communication network where the ring systems can be installed. The topology consists of nodes 1 and spans 2. A ring system is formed by the ring 3. The ring 3 represents a closed path which does not contain the same nodes 1 of two or more and the same nodes 2 of two or more.

As shown in FIGS. 11 and 13, the ring system consists of an add drop multiplexers (ADMS) 61 to 64 and fibers 7 and 71 to 74. The ADM 61 is set up to the node 1 configuring the ring 3. The fiber 71 is set up to the span 3 configuring the ring 3. Plural ring systems may be set up to the same ring 3.

The ADM 6, as shown in FIG. 12, separates the channel 103 to be received from the fiber 75 or inserts the channel 104 to be transmitted in the fiber 76. Specifically, the channel 101 with the slot #1 allocated and the channel 102 with the slot #2 allocated can pass through the ADM 6 while the slot numbers are not changed. The channel 103 with the slot #3 allocated is branched from the fiber 75 to receive by the ADM 6. The channel 104 with the slot #4 allocated is inserted in the fiber 76 to transmit from the ADM 6. The slot represents identifying channels multiplexed within a single fiber. Specifically the time slot in time division multiplex corresponds to the wavelength in wave division multiplex.

As disclosed in the foregoing literature, the ring system is roughly classified into a bi-directional ring system and an uni-directional ring system. FIG. 11 illustrates the configuration of the bi-directional ring system 8. Referring to FIG. 11A, a group of working fibers are set up in the bi-directional ring system 8 to accommodate bi-directional channels between certain ADMs in a normal state.

For example, the channels 106 and 107 are bi-directionally installed along the path routing counterclockwise from the ADM 61 to the ADM 64. Moreover, a group of spare fibers that can accommodate bi-directional channels are installed for the failure. At a system failure, the ADMs connected to both ends of the spare fiber group changes the fiber connection. As shown in FIG. 11B, when the working fiber 71 and the spare fiber 72 between the ADMs 62 and 63 are cut, the ADM 62 is connected to the spare fiber 73 while ADM 63 is connected to the spare fiber 74. Thus, the channel 106 is changed to the channel 108 so that the channel routing from the ADM 64 to the ADM 61 is secured.

FIG. 13 shows slot numbers allocated to respective channels on the uni-directional fiber set between ADMs in the bidirectional ring system 8. In this example, it is assumed that 32 channels per fiber at maximum can be multiplexed. Each ADM, as shown in FIG. 11, does not change the slot number of the channel 10 passing through the ADM. Hence, the same slot number must be allocated to the fiber through which each channel 10 is routed.

Referring to FIG. 13, 8 channels are set between the ADMs 61 and 63. Slot numbers #12 to #19 are respectively allocated to the 8 channels along the path routing clockwise or counterclockwise between the ADM 61 and the ADM 63. The channel with #20 allocated is set along the path routed counterclockwise between the ADMs 63 and 64. The channels with the slot numbers #1 to #7 are set along the path routing clockwise between the ADMs 61 and 64. The channels with the slot numbers #1 to #11 are set along the path routing counterclockwise between the ADMs 61 and 64.

FIG. 13 shows the method wherein the bi-directional ring system 8 detours around a failure in span units. In addition, there is the failure detouring method which changes channels used across each node pair from channels on a clockwise or counterclockwise routing path to the channels with the same slot on a counterclockwise or clockwise routing path.

In the bi-directional ring system shown in FIG. 11, if the ADM 62 is failed, each of the ADMs 61 and 63 turns back the channels within the working fiber to a spare fiber, so that the failed channel can be restored.

FIG. 14 illustrates the configuration of the unidirectional ring system. As shown in FIG. 14A, the unidirectional ring system 9 simultaneously accommodates in a normal state a group of bidirectional channels in the clockwise direction and a group of bi-directional channels in the counterclockwise direction, which are installed between a group of ADMs 6. For example, the bi-directional channels 109 and 1011 routing between the ADMs 61 and 64 are accommodated clockwise within the uni-directional working fiber 77. Another group of bi-directional channels 1010 and 1012 arc accommodated counterclockwise within the spare fiber 78. The ADM 61 receives two channels 109 and 1010 while the ADM 64 receives two channels 1011 and 1012. As shown in FIG. 14B, cutting the working fiber 77 and the spare fiber 78 between the ADMs 62 and 63 does not adversely affect the channels 1010 and 1011 so that the bi-directional channel between the ADMs 61 and 64 can be secured.

The uni-directional ring system 9 shown in FIG. 14 can secure the bi-directional channels even in a failure of the ADM 62. Unlike the bi-directional ring system 8, the uni-directional system accommodates the bi-directional channels installed between arbitrary ADMs in a uni-directional direction (clockwise or counterclockwise) circled from a node 1 to another node 1 within the ring 3. In this case, the maximum number of channels required between ADMs within each ring system is equal to the total number of slots per fiber.

FIG. 15 is a schematic diagram illustrating an inter-ring connection network where plural bi-directional ring systems 81 to 83 are connected together. When a channel is set between different nodes 1 not belonging to the same ring 3, it must be routed via plural different bi-directional systems installed in different rings 3. For example, in the bi-directional ring systems 81 and 82 respectively installed in different rings 3, the cross connect unit (XC) 5 interconnects the ADMs 66 and 67 in the same node 14. The XC unit has the cross connect function of arbitrarily connecting a routing channel from a certain port to another port and the slot conversion function of converting the slot number allocated to the channel routing each port.

The ADM 68 belonging to the bi-directional ring system 82 is connected to the ADM 69 belonging to the bi-directional ring system 83. When the channel 105 is set between the ADM 65 installed to the node 13 and the ADM 68 installed to the node 15, the slot #1 is allocated to the route between the ADMs 65 and 66 belonging to the bi-directional ring system 81 while the slot #3 is allocated to the route between the ADMs 67 and 68 belonging to the bi-directional ring system 82.

In this case, the XC 5 switches the slot number #1 to the slot number #3. When the XC 5 performs the slot conversion by interconnecting different bi-directional ring systems 8, independent slot numbers can be allocated to bi-directional ring systems through which channels are routed. As a result, the improved channel accommodation efficiency can be expected, compared with the case of no connection with the XC 5. However, it should be noted that when the XC 5 in the node 14 is in a trouble state, the channel 105 cannot be recovered.

There is the conventional designing method, which decides the placement of ring systems and-path routes to minimize the facility costs of an inter-ring connection network or a network configured of plural ring systems, based on the numerical programming. Such a method is disclosed in the literature, S. Bortolon, H. M. F. Tavares, R. V. Riberio, E. Quaglia, and M. A. Bergamaschi, "A methodology to SDH networks design using optimization tools", Proceedings of IEEE Globcom 96, pp. 1867–1871, 1996.

In the above-mentioned prior art, a bundle of channels routing via the same node 1 or same span 2 to the same demand pair 11 (refer to FIG. 17) is here called a path. The capacity of a path corresponds to the total number of channels contained therein. A route candidate of a path is provided based on the span 1, the ring 3 or the node 2. The demand pair 11 represents a pair of nodes on the both ends of a path to be set. One or plural paths are set across the demand pair 11 to secure the number of channels (required capacity) required between the nodes.

According to the foregoing reference, the path accommodated in the bi-directional ring system 8 provides a route based on the span 2 and is called a span base path 41. As shown in FIG. 16, all span base paths 41, routing a certain span 2, are accommodated in all bi-directional ring systems 8 installed to a candidate ring 3 containing the span 2. Moreover, as shown in FIG. 17, the path accommodated in a uni-directional ring system 9 provides a route based on the ring 3 to which all uni-directional ring systems are installed. Such a path is here called a ring base path 42.

In order to formulate a design problem based on the above-mentioned concepts, the symbols are defined as follows:

R=1 to R (a number allocated to a ring)

S=1 to S (a number allocated to a span)

P=1 to P (a number allocated to a demand pair)

1p=1 to Lp (a number allocated to a path candidate used by a demand pair p)

FIG. 18 shows definitions of constants according to the items 1 to 7. FIG. 19 shows definitions of variables according to the items 1 to 3. The conventional inter-ring connection network design problem can be formulated by the following prescribed formula 1 using the above-listed definitions.

Problem 1:
(formula 1)

$$\text{minimize} \sum_{r=1}^{R} a_r^B d_r^B + \sum_{r=1}^{R} a_r^U d_r^U \quad (1\text{-}1)$$

-continued $$\text{subject to} \sum_{lp=1}^{Lp} c_{lp} = v_p (p = 1, \ldots, P) \quad (1\text{-}2)$$

$$\sum_{p=1}^{P} \sum_{lp=1}^{Lp} g_{lp}^S c_{lp} \le \Omega \sum_{r=1}^{R} g_r^S d_r^B (s = 1, \ldots, S) \quad (1\text{-}3)$$

$$\sum_{p=1}^{P} \sum_{lp=1}^{P} g_{lp}^r c_{lp} \le \Omega d_r^U (r = 1, \ldots, R) \quad (1\text{-}4)$$

The formula (1-1) is an objective function to be minimized and represents the total costs required to install the bi-directional ring system 8 and the uni-directional ring system 9. The formula (1-2) is a constraint formula representing that the sum of capacities allocated to paths 4 usable across the demand pair 11 is equal to the capacity required across the demand pair 11.

The formula (1-3) is a constraint formula representing that the sum of capacities allocated to the span base path 41 routing each span 2 does not exceed the sum of capacities of the bi-directional ring systems 8 installed to a ring candidate 3 containing the span 2. The formula (1-4) is a constraint formula insuring that the sum of capacities allocated to the span base path 42 routing each span 2 does not exceed the sum of capacity of the uni-directional ring systems 9 installed to a ring candidate 3.

FIG. 20 shows a concrete design procedure in the conventional inter-ring connection network designing method. First, a route for a candidate ring 3 as well as a route for a candidate span base path 41 and a candidate ring base path 42 are decided based on connection information about the node 1 and the span 2 (step C1). Next, an integer programming problem 1 is created based on the decided results (step C2). Finally, the problem 1 is solved using the branch restricting method. The number of bi-directional ring systems 8 installed in a candidate ring 3, the number of uni-directional ring systems 9 installed in a candidate ring 3, the capacity allocated to each span base path 41, and the capacity allocated to each ring base path 42 are decided using the resultant solutions (step C3).

The branch restricting method is a typical method for solving the linear programming problem, as shown, for example, by H. P. Williams, "Mathematical Programming Model", published by Sangyo-Tosyo. Here, a variable with no integer value is selected from solutions of a linear programming problem selected at a stage. Further, the next linear programming problem, obtained by adding a constraint formula restricting the range covered by the selected variable, is solved using integers larger or smaller than the value of the selected variable. This procedure is repeatedly applied to variables not being integers so that solutions in which all variables become integers are obtained.

However, the conventional network designing method has the following disadvantages.

The first problem is that design results cannot be reflected to the channel setting in an actual inter-ring connection network without any process. The resultant solutions are used to obtain routes for the span base path 41 and the ring base path 42, installation spots of the bi-directional ring system 8 and the uni-directional ring system 9, and the number of ring systems to be installed. It is impossible to specify the slot number allocated to each channel routing the each bi-directional ring system 8 as well as the number of channels to be routed between nodes 1. Moreover, the node 1 in which an ADM is installed cannot be specified to an installed ring system.

The second problem is that when the costs regarding XCs or ADMs cannot be ignored to the costs regarding the ring systems, it is often difficult to optimize the comprehensive facility costs containing the cost of XCs. The reason is that since the conventional method does not provide a route candidate specifying the hub 12, being the node 1 installed with XC, the XC installation costs cannot be calculated. Moreover, since the conventional method does not specify nodes to which an ADM is installed, to an installed ring system, the number of ADMs to be installed cannot be calculated.

The third problem is that when a failure occurs in a hub 12 to which the XC unit for connectting the ring systems is installed, it is impossible to recover the hub 12. The reason is that the conventional method does not incorporate the means of specifying the hub 12, being the node 1 to which XC is installed, and additionally securing a previously allocated capacity to a path subject to the failure.

SUMMARY OF THE INVENTION

The present invention is made to solve the above-mentioned problems.

The objective of the invention is to provide a network designing method that can immediately use available design results for the construction and operation of an actual network and to provide a recording medium that records the control program for the above-mentioned network designing method.

Another objective of the present invention is to provide a network designing method that can minimize the total setup costs containing costs regarding the cross connect (XC) and the add drop multiplexer (ADM) and to provide a recording medium that records the control program for the above-mentioned network designing method.

Still another objective of the present invention is to provide a network designing method that can satisfy a required capacity even in a hub failure state and to provide a recording medium that records the control program for the above-mentioned network designing method.

The objective of the present invention is achieved by a network designing method, comprising the steps of providing a route for each of path candidates installable between demand pairs by means of connection relationships between nodes and spans in a network, a demand pair being a terminal terminating node, and a hub being a node to which a cross connect unit is installable, based on ring candidates on which a bi-directional ring system or unidirectional ring system is installable and an arrangement of rings contained in the demand pair and the hub; creating an integer programming problem containing at least a first variable, a second variable, a third variable, a fourth variable, a fifth variable, a sixth variable, a seventh variable, a first constraint, a second constraint, a third constraint, a fourth constraint, and a fifth constraint; the first variable representing a capacity allocated to each of the paths; the second variable representing whether a k-th bidirectional ring system is installed to a r-th ring candidate; the third variable representing whether an add drop multiplexer is installed, wherein the add drop multiplexer branches and inserts the channel from said k-th bi-directional ring system which is installed to the r-th ring candidate, in the node contained in the r-th ring candidate; the fourth variable representing whether the channel, to which a slot number is allocated, is routed on clockwise route or counterclockwise route between respective adjacent nodes, the adjacent nodes being contained in the r-th ring candidate and in at least one of the path candidates to the demand pair in the k-th bi-directional ring system installed to the r-th ring candidate; the fifth variable representing whether said k-th uni-directional ring system is installed to the r-th ring candidate; the sixth variable representing whether add drop mulitplexer is installed, the add drop multiplexer branching and inserting the channel from the k-th unidirectional ring system installed to the r-th ring candidate in the node contained in the r-th ring candidate; the seventh variable representing the number of channels to be routed between respective adjacent nodes contained in the r-th ring candidate and in at least one of routes for the path candidates to the demand pair in the k-th uni-directional ring system installed to the r-th ring candidate; the first constraint representing that the total number of channels is smaller than the total number of capacities allocated to all paths routing the adjacent nodes, the channels routing the bi-directional systems and the unidirectional systems installed to each of the ring candidates containing the adjacent nodes in respective adjacent nodes existing on at least one of the routes for the path candidates; the second constraint representing that when the k-th bi-directional ring system is installed to the r-th ring candidate, the number of passable channels to which slots are allocated in respective spans contained in said r-th ring candidate is only one of all clockwise or counterclockwise routes routing the span, the routes existing in adjacent nodes contained in the r-th ring candidate or in at least one route of the path candidates to the demand pair; the third candidate representing that when the k-th uni-directional ring system is installed to the r-th ring candidate, the total number of channels routing between adjacent nodes contained in the r-th ring candidate and in at least one route of the path candidates to the demand pair does not exceed the total number of slots per fiber; the fourth constraint representing that when an add drop mulitplexer is installed to each of nodes contained in the r-th ring of the k-th bi-directional ring system installed to the r-th ring candidate, the total number of channels to be branched and inserted in each node does not exceed twice the total number of channels per fiber; the fifth constraint representing that when an ADM (add drop multiplexer) is installed to each of nodes contained in the r-th ring of the k-th unidirectional ring system installed to the r-th ring candidate, the total number of channels to be branched and inserted in each node does not exceed the total number of channels per fiber; and deciding the number of the bi-directional ring systems to be installed to the ring candidate based on a solution of the integer programming problem, the number of the uni-directional ring systems to be set to the ring candidate based on a solution of the integer programming problem, a node to which the ADM is installed in each bi-directional ring system, and a slot number allocated to a channel routing the bi- and uni-directional ring systems to be installed.

According to the present invention, a network designing method, comprises the steps of providing a route for each of path candidates installable between demand pairs by means of connection relationships between nodes and spans in a network, a demand pair being a terminal terminating node, and a hub being a node to which a cross connect unit is installable, based on ring candidates on which a bidirectional ring system is installable and an arrangement of rings contained in the demand pair and the hub; creating an integer programming problem containing at least a first variable, a second variable, a third variable, a fourth variable, a first constraint, a second constraint, and a third constraint; the first variable representing a capacity allocated to each of paths; the second variable representing whether a k-th bi-directional ring system is installed to a r-th ring candidate; the third variable representing whether an add drop multiplexer is installed, wherein the add drop multiplexer branches and inserts the channel from said k-th bidirectional ring system which is installed to the r-th ring candidate, in the node contained in the r-th ring candidate; the fourth variable representing whether the channel, to which a slot number is allocated, is routed on clockwise route or counterclockwise route between respective adjacent nodes, the adjacent nodes being contained in the r-th ring candidate and in at least one of the path candidates to the demand pair in the k-th bidirectional ring system installed to the r-th ring candidate; the first constraint representing that the total number of channels is smaller than the total number of capacities allocated to all paths routing the adjacent nodes, the channels routing the bi-directional systems and the unidirectional systems installed to each of said ring candidates containing said adjacent nodes in respective adjacent nodes existing on at least one of routes for the path candidates; the second constraint representing that when the k-th bidirectional ring system is installed to the r-th ring candidate, the number of passable channels to which slots are allocated in respective spans contained in the r-th ring candidate is only one of all clockwise or counterclockwise routes routing the span, the routes existing in adjacent nodes contained in the ring candidate or in at least one route of the path candidates to the demand pair; the third constraint representing that when an add drop multiplexer is installed to each of nodes contained in the r-th ring of the k-th bi-directional ring system installed to the r-th ring candidate, the total number of channels to be branched and inserted in each node does not exceed twice the total number of channels per fiber; and deciding at least the number of the bi-directional ring systems to be installed to the ring candidate based on a solution of the integer programming problem, a node to which the add drop multiplexer is installed in the bi-directional ring system, and a slot number allocated to a channel routing the bi-directional ring system to be installed.

Moreover, according to the present invention, in a recording medium on which a program is recorded for executing a network designing method by a computer, the program comprises the steps of providing a route for each of path candidates installable between demand pairs by means of connection relationships between nodes and spans in a network, a demand pair being a terminal terminating node, and a hub being a node to which a cross connect unit is installable, based on ring candidates on which a bi-directional ring system or unidirectional ring system is installable and an arrangement of rings contained in the demand pair and the hub; creating an integer programming problem containing at least a first variable, a second variable, a third variable, a fourth variable, a fifth variable, a sixth variable, a seventh variable, a first constraint, a second constraint, a third constraint, a fourth constraint, and a fifth constraint; the first variable representing a capacity allocated to each of the paths; the second variable representing whether a k-th bi-directional ring system is installed to a r-th ring candidate; the third variable representing whether an add drop multiplexer is installed, wherein the add drop multiplexer branches and inserts the channel from said k-th bi-directional ring system which is installed to the r-th ring candidate, in the node contained in the r-th ring candidate; the fourth variable representing whether the channel, to which a slot number is allocated, is routed on clockwise route or counterclockwise route between respective adjacent nodes, the adjacent nodes being contained in the r-th ring candidate and in at least one of the path candidates to the demand pair in the k-th bi-directional ring system installed to the r-th ring candidate; the fifth variable representing whether said k-th uni-directional ring system is installed to the r-th ring candidate; the sixth variable representing whether add drop mulitplexer is installed, the add drop multiplexer branching and inserting the channel from the k-th unidirectional ring system installed to the r-th ring candidate in the node contained in the r-th ring candidate; the seventh variable representing the number of channels to be routed between respective adjacent nodes contained in the r-th ring candidate and in at least one of routes for the path candidates to the demand pair in the k-th unidirectional ring system installed to the r-th ring candidate; the first constraint representing that the total number of channels is smaller than the total number of capacities allocated to all paths routing the adjacent nodes, the channels routing the bidirectional systems and the uni-directional systems installed to each of the ring candidates containing the adjacent nodes in respective adjacent nodes existing on at least one of the routes for the path candidates; the second constraint representing that when the k-th bi-directional ring system is installed to the r-th ring candidate, the number of passable channels to which slots are allocated in respective spans contained in said r-th ring candidate is only one of all clockwise or counterclockwise routes routing the span, the routes existing in adjacent nodes contained in the r-th ring candidate or in at least one route of the path candidates to the demand pair; the third candidate representing that when the k-th uni-directional ring system is installed to the r-th ring candidate, the total number of channels routing between adjacent nodes contained in the r-th ring candidate and in at least one route of the path candidates to the demand pair does not exceed the total number of slots per fiber; the fourth constraint representing that when an add drop mulitplexer is installed to each of nodes contained in the r-th ring of the k-th bi-directional ring system installed to the r-th ring candidate, the total number of channels to be branched and inserted in each node does not exceed twice the total number of channels per fiber; the fifth constraint representing that when an ADM (add drop multiplexer) is installed to each of nodes contained in the r-th ring of the k-th unidirectional ring system installed to the r-th ring candidate, the total number of channels to be branched and inserted in each node does not exceed the total number of channels per fiber; and deciding the number of the bi-directional ring systems to be installed to the ring candidate based on a solution of the integer programming problem, the number of the unidirectional ring systems to be set to the ring candidate based on a solution of the integer programming problem, a node to which the ADM is installed in each bi-directional ring system, and a slot number allocated to a channel routing the bi- and uni-directional ring systems to be installed.

Furthermore, according to the present invention, in a recording medium on which a program is recorded for executing a network designing method by a computer, the program comprises the steps of providing a route for each of path candidates installable between demand pairs by means of connection relationships between nodes and spans in a network, a demand pair being a terminal terminating node, and a hub being a node to which a cross connect unit is installable, based on ring candidates on which a bi-directional ring system is installable and an arrangement of rings contained in the demand pair and the hub; creating an integer programming problem containing at least a first variable, a second variable, a third variable, a fourth variable, a first constraint, a second constraint, and a third constraint; the first variable representing a capacity allocated-to each of paths; the second variable representing whether a k-th bi-directional ring system is installed to a r-th ring candidate; the third variable representing whether an add drop multiplexer is installed, wherein the add drop multiplexer branches and inserts the channel from the k-th bi-directional ring system which is installed to the r-th ring candidate, in the node contained in the r-th ring candidate; the fourth variable representing whether the channel, to which a slot number is allocated, is routed on clockwise route or counterclockwise route between respective adjacent nodes, the adjacent nodes being contained in the r-th ring candidate and in at least one of the path candidates to the demand pair in the k-th bi-directional ring system installed to the r-th ring candidate; the first constraint representing that the total number of channels is smaller than the total number of capacities allocated to all paths routing the adjacent nodes, the channels routing the bi-directional systems and the unidirectional systems installed to each of the ring candidates containing the adjacent nodes in respective adjacent nodes existing on at least one of routes for the path candidates; the second constraint representing that when the k-th bi-directional ring system is installed to the r-th ring candidate, the number of passable channels to which slots are allocated in respective spans contained in the r-th ring candidate is only one of all clockwise or counterclockwise routes routing the span, the routes existing in adjacent nodes contained in the ring candidate or in at least one route of the path candidates to the demand pair; the third constraint representing that when an add drop multiplexer is installed to each of nodes contained in the r-th ring of the k-th bidirectional ring system installed to the r-th ring candidate, the total number of channels to be branched and inserted in each node does not exceed twice the total number of channels per fiber; and deciding at least the number of the bi-directional ring systems to be installed to the ring candidate based on a solution of the integer programming problem, a node to which the add drop multiplexer is installed in the bi-directional ring system, and a slot number allocated to a channel routing the bi-directional ring system to be installed.

In the above description, the adjacent node represents a pair of nodes being adjacent to each other in a candidate route for a node base path 43, as shown in FIG. 9, which is formed in the order of the node number belonging to the demand pair 11, the node number of the hub 12, the node number of the hub 12, node number of the hub 12, . . . , and another node number belonging to the demand pair 11. Let us now consider that the channel passing through adjacent nodes on the route for a node base path 43 routes within all bi-directional ring systems 8 or uni-directional ring systems 9 which may be installed to a candidate ring 3 containing the adjacent nodes.

Variables regarding a slot to be allocated to a clockwise or counterclockwise route between nodes 1 are set to channels routing a bi-directional ring system 8 to be installed to each candidate ring 3. The slot allocation can be decided to the channel which routes a bi-directional ring system 8 to be immediately installed, by means of the solution of the integer programming solved based on variables.

As shown in FIG. 9, a candidate route for the path 4 installable between the demand pair 11 is provided based on the arrangement of the nodes 1 being the demand pair 11 and the nodes 1 being the hubs 12. Thus, the sum of capacities of the path 4 routing the hubs 12 where the XC 5 are installed can be calculated. Hence, the costs regarding XZs 5 can be calculated from the number of XC units 5 installed at a hub 12. The resultant costs are included in the objective function so that the comprehensive facility costs can be minimized.

When a failed hub 12 adversely affects the node base path 43 included on the same route, the path allocation capacity becomes 0. At this time, the required capacity of the demand pair 11 is satisfied by the capacity allocated to another node base path 43, not affected by the failure. Hence, a capacity larger than the required capacity of each demand pair in a normal state is previously allocated to the node base path 43 on which the demand pair 11 is usable.

BRIEF DESCRIPTION OF THE INVENTION

This and other objects, features, and advantages of the present invention will become more apparent upon a reading of the following detailed description and drawings, in which:

FIG. 2 is a table listing definitions of constants according to the first embodiment of the present invention;

FIG. 3 is a table listing definitions of indicators according to the first embodiment of the present invention;

FIG. 4 is a table listing definitions of variables according to the first embodiment of the present invention;

FIG. 5 is a flowchart showing in detail the step A3 in the flowchart of FIG. 1;

FIG. 6 is a table listing definitions of variables in a modification of the first embodiment of the present invention;

FIG. 8 is a table listing definitions of symbols according to the third embodiment of the present invention;

Figure 11B:
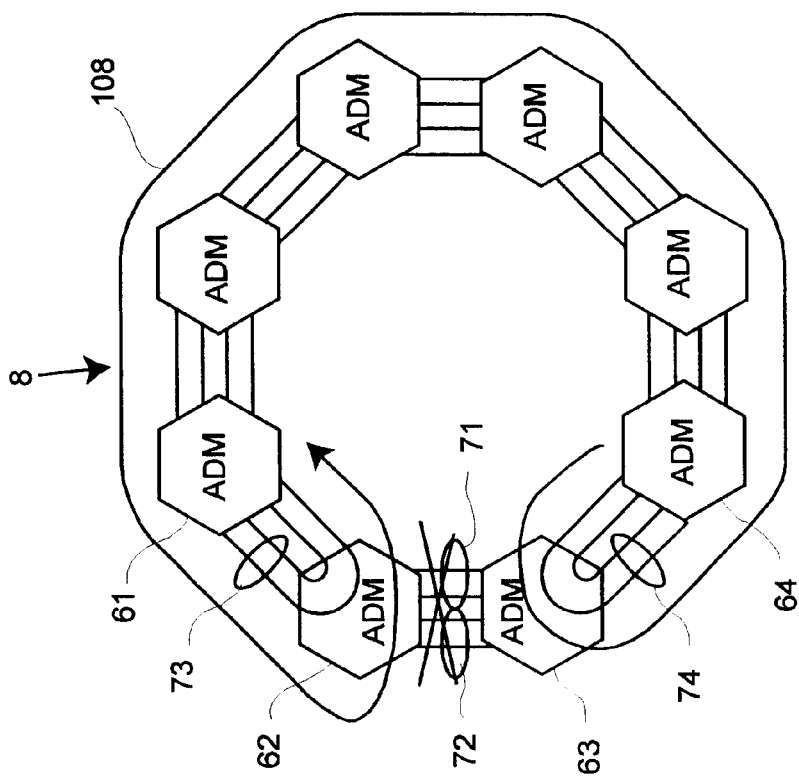
Figure 11A:
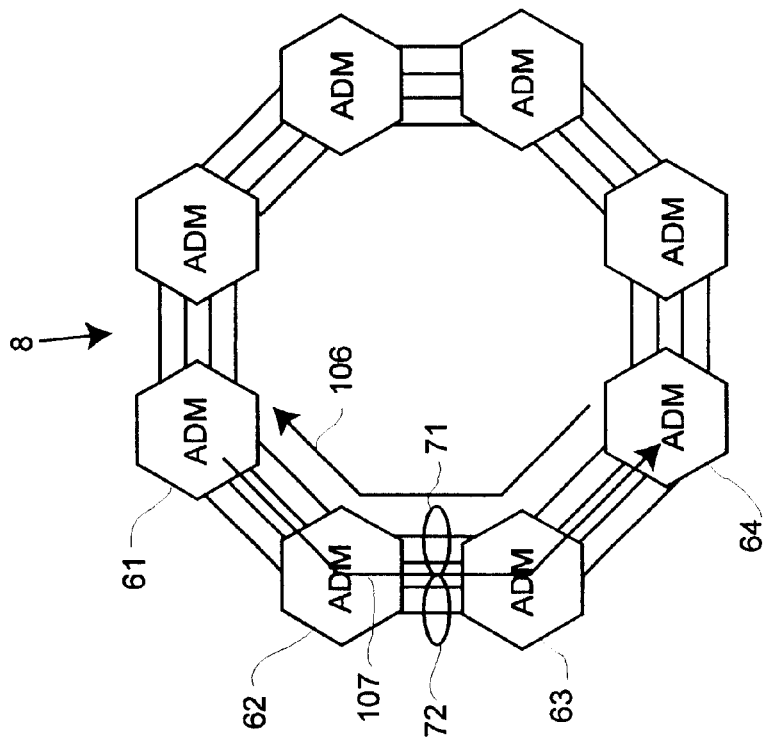
Figure 12:
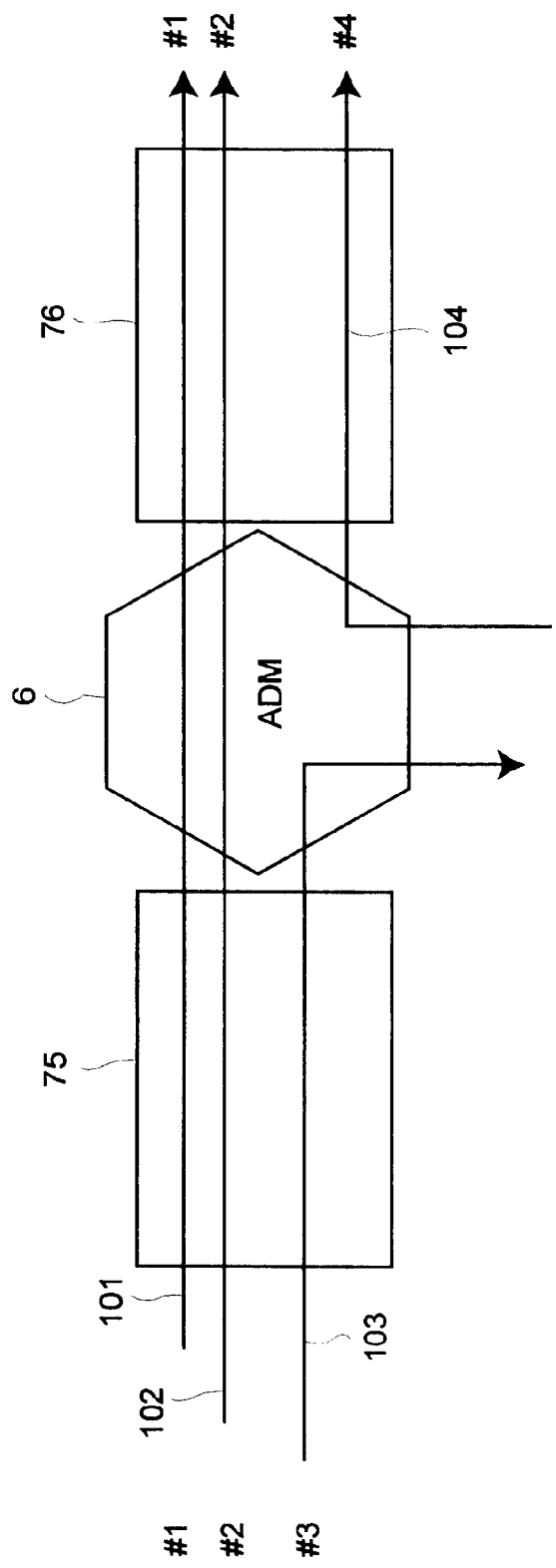
Figure 13:
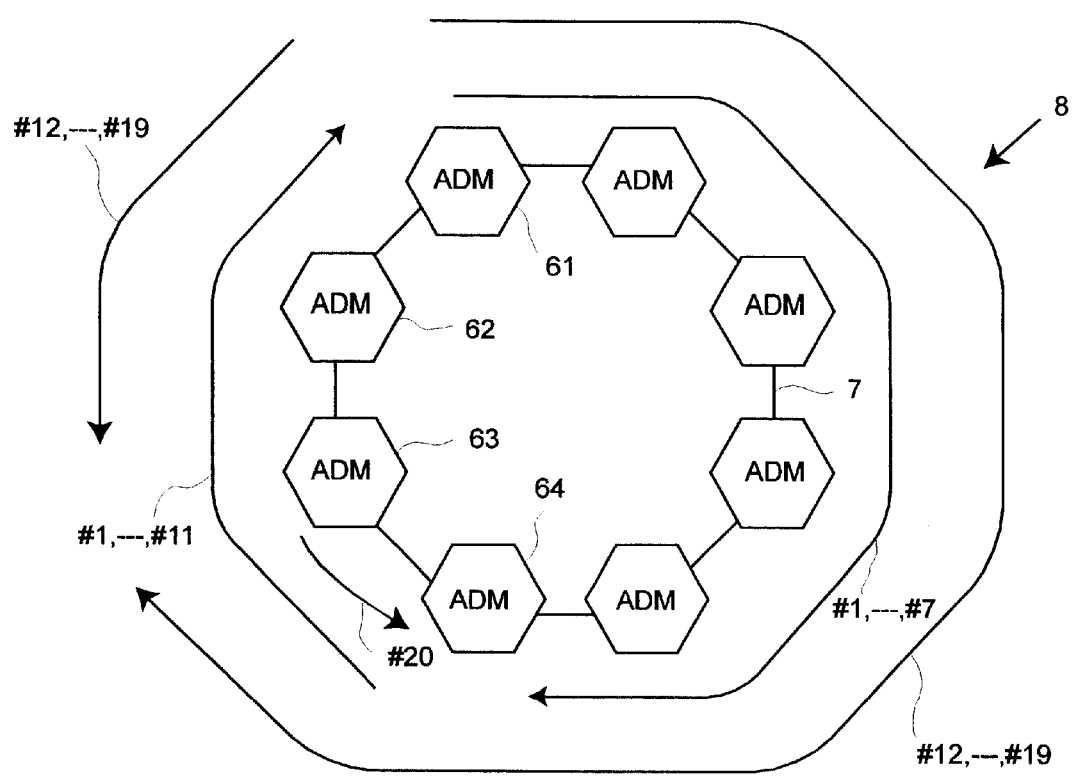
Figure 14B:
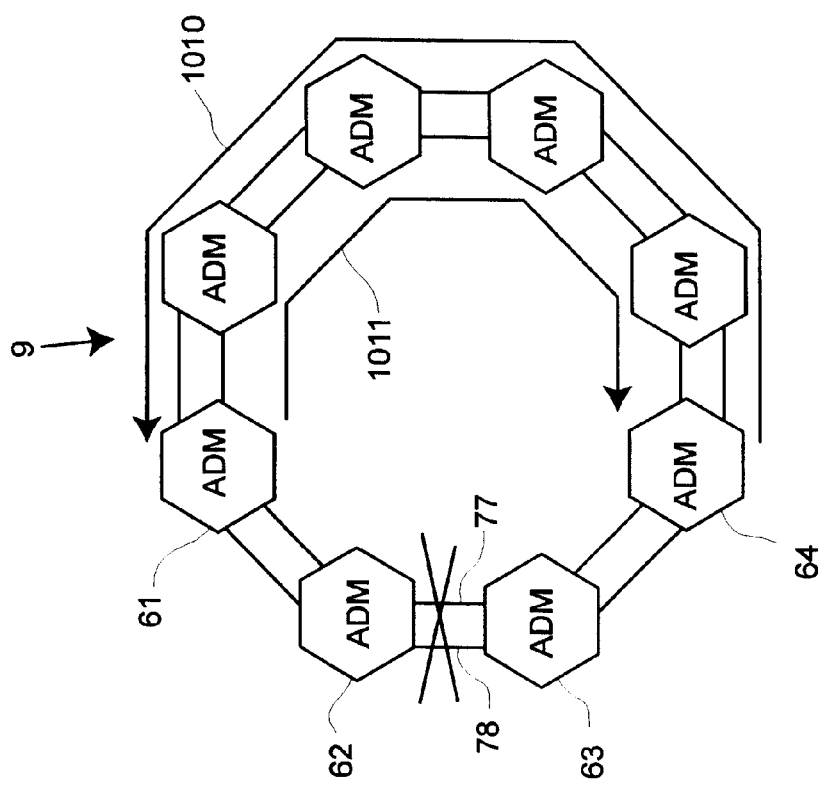
Figure 14A:
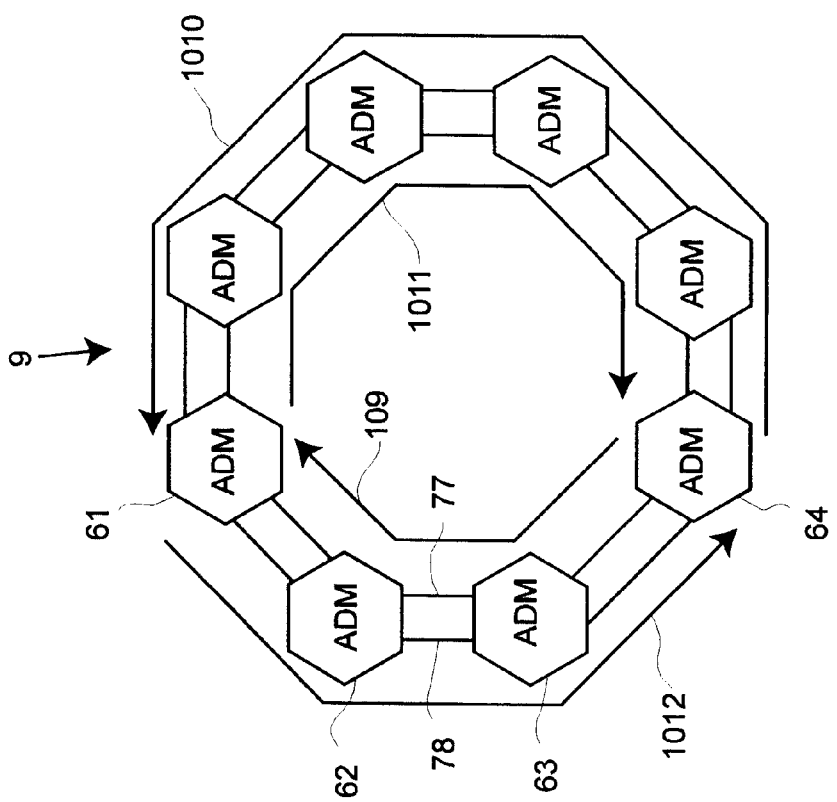
Figure 15:
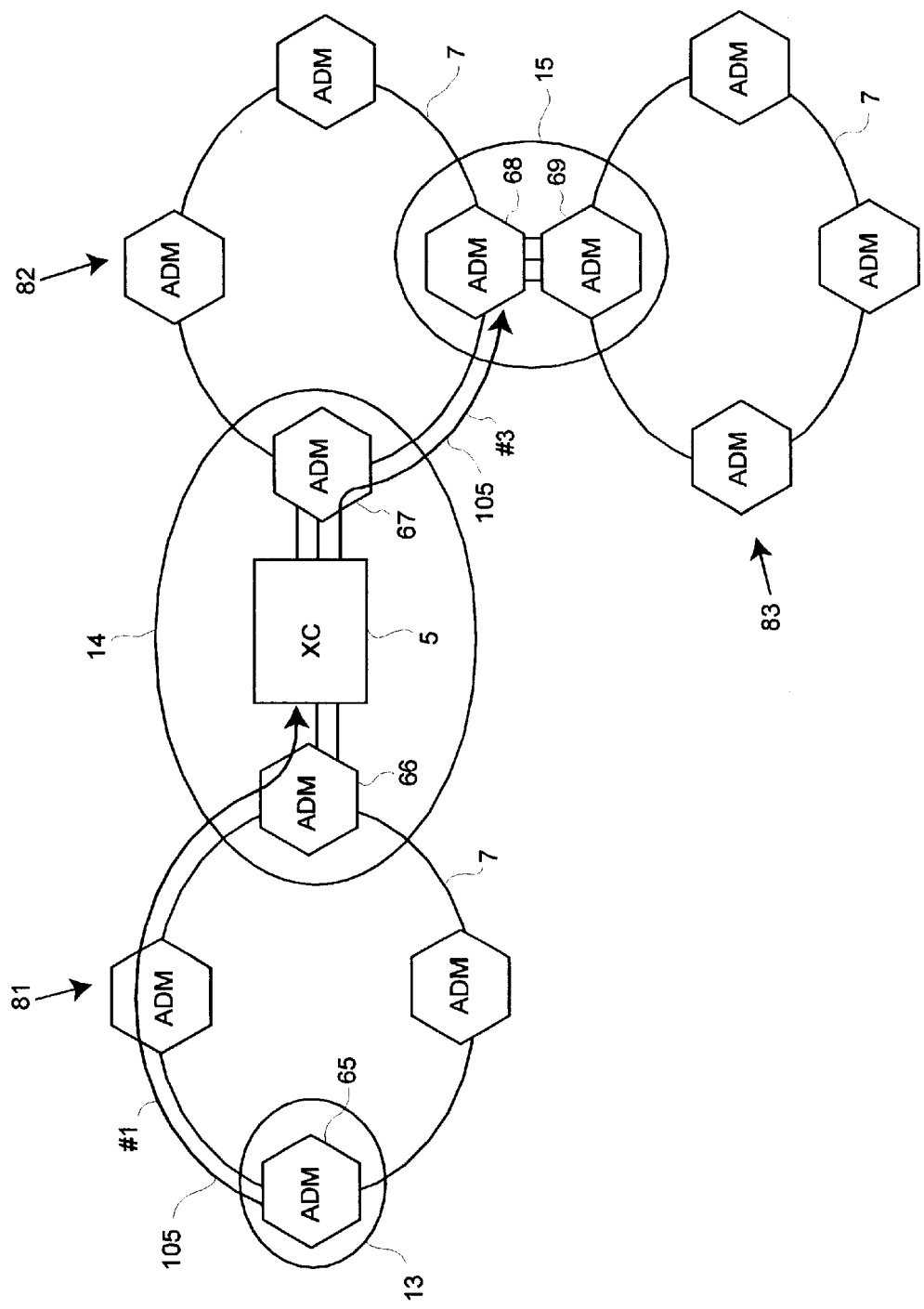
Figure 16:
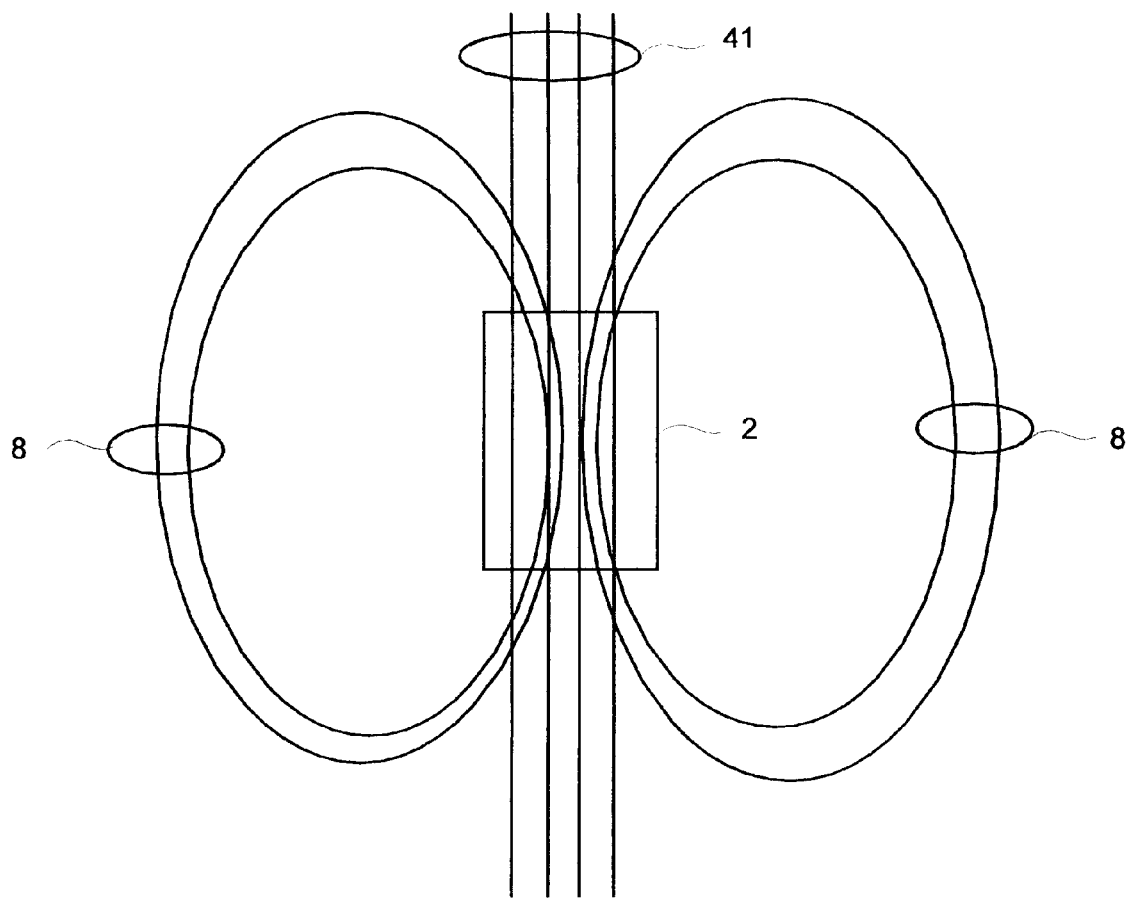
Figure 17:
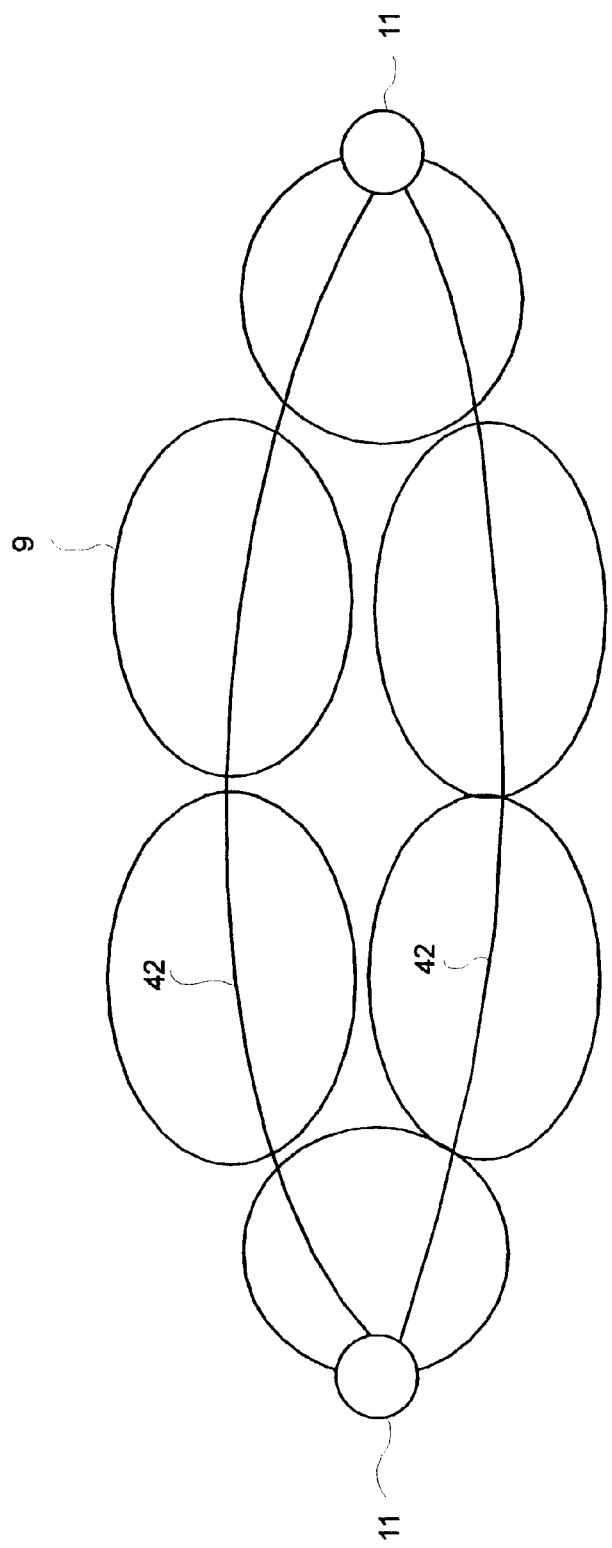

FIGS. 11A and B are schematic diagrams each explaining an bi-directional ring system;

FIG. 12 is a schematic diagram explaining the function of an add drop multiplexer (ADM);

FIG. 13 is a schematic diagram explaining slot allocation in a bi-directional ring system;

FIGS. 14A and B are schematic diagrams each explaining a uni-directional ring system;

FIG. 15 is a schematic diagram explaining an inter-ring connection network;

FIG. 16 is a schematic diagram explaining the capacity allocation in a prior-art bi-directional ring system;

FIG. 17 is a schematic diagram explaining a prior-art method of setting path routes via uni-directional ring systems;.

Figure 20:
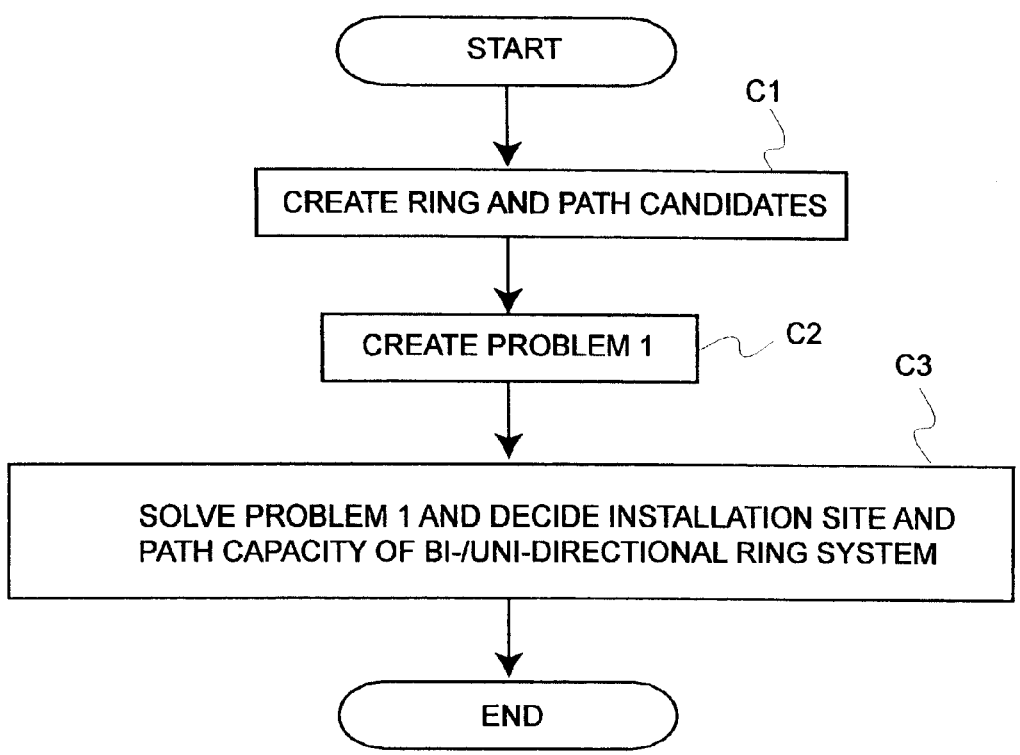

FIG. 18 is a table listing definitions of constants in a prior-art network designing method;

FIG. 19 is a table listing definitions of variables in a prior-art network designing method; and FIG. 20 is a flowchart illustrating a prior-art network system designing method.

DESCRIPTION OF THE EMBODIMENTS

Embodiments of the present invention will be described below with reference to the attached drawings. First, symbols used for the formulation of the design problem will be explained here. FIG. 2 shows a table of items 1 to 9 in which constants are defined.

The formula, K=1 to $K^{B/U}$, defines allocation to a bi-directional ring system to be set to each ring. Since the bi-directional ring system 8 uses 4 fibers per span, the upper limit number of systems, K, installable to each ring candidate is set over range of integers not exceeding D/4.

Indicators are defined according to the item numbers 1 to 4 of FIG. 3. Variables are defined according to the item numbers 1 to 6 of FIG. 4. Q defines a set of a pair of adjacent nodes existing on a route candidate for at least one node base path. H defines a set of nodes being hubs.

The following design problem is defined as the integer programming problem 2 based on the above-mentioned definitions.

Problem 2:
(formula 2)

$$\text{Minimize } 4\sum_{r=1}^{R}\sum_{k=1}^{K^g}\sum_{s=1}^{S} a_s g_r^s d_{r,k}^B + 2\sum_{r=1}^{R}\sum_{k=1}^{K^U}\sum_{s=1}^{S} a_s g_r^s d_{r,k}^U + \tag{2-1}$$

$$r^{BADM}\sum_{r=1}^{R}\sum_{k=1}^{K^S}\sum_{n=1}^{N} o_r^n f_{r,k,n}^B + r^{UADM}\sum_{r=1}^{R}\sum_{k=1}^{K^g}\sum_{n=1}^{N} o_r^n f_{r,k,n}^U + r^{xc}\sum e_n^{xc}$$

$$\text{subject to } \sum_{lp=1}^{Lp} c_{lp} \geq v_p \; (p=1 \ldots P) \tag{2-2}$$

$$\sum_{p=1}^{P}\sum_{lp=1}^{Lp}\sum_{k(lp)=1}^{H(lp)} \delta_{k(lp)}^{n,m} c_{lp} \leq \tag{2-3}$$

$$\sum_{r=1}^{R}\sum_{k=1}^{K^S}\sum_{\omega=1}^{\Omega}\sum_{ct=(cs,ct)} o_r^n o_r^m u_{r,k,\omega}^{n,m,ct} + \sum_{r=1}^{R}\sum_{k=1}^{Ku} b_{r,n,m}^k ((n,m)\in Q)$$

$$\sum_{ct=(cw,ct)}\sum_{(n,m)\in Q} g_{r,n,m}^{ct} u_{r,n,m}^{k,\omega,ct} \leq d_{r,k}^B \tag{2-4}$$

$(r=1 \ldots R, k=1, \ldots K, s=1 \ldots S, \omega=1 \ldots \Omega s \cdot t \cdot g_s^r = 1)$ $$\sum_{(n,m)\in Q} b_{r,n,m}^k \leq \Omega d_r^U (r=1 \ldots R, k=1 \ldots k^U) \tag{2-5}$$

$$d_{r,k}^{B/U} \geq d_{r,l+1}^{B/U} (r=1 \ldots R, k=1 \ldots k^{B/U}-1) \tag{2-6}$$

$$4\sum_{r=1}^{R}\sum_{k=1}^{k^S} g_r^S d_{r,k}^B + 2\sum_{r=1}^{R}\sum_{k=1}^{k^u} g_r^s d_{r,k}^U \leq D \; (s=1 \ldots S) \tag{2-7}$$

$$\sum_{\omega=1}^{\Omega}\sum_{ct=(cw,ct)}\sum_{(n,m)\in Q,n(m} o_r^n o_r^m u_{r,m,n}^{k,\omega,ct} + \tag{2-8}$$

$$\sum_{\omega=1}^{\Omega}\sum_{ct(cw,ct)}\sum_{(m,n)\in Qm(n} o_r^n o_r^m u_{r,m,n}^{k,\omega,ct} \leq 2\Omega f_{r,k,n}^U$$

$(r=1 \ldots R, k=1 \ldots K^U, n=1 \ldots N)$ $$\sum_{ct(cw,ct)}\sum_{(n,m)\in Q,n(m} o_r^n o_r^m b_{r,m,n}^k + \tag{2-9}$$

$$\sum_{ct(cw,ct)}\sum_{(m,n)\in Q,m(nm} o_r^n o_r^m b_{r,m,n}^k \leq \Omega f_{r,k,n}^U$$

$(r=1 \ldots R, k=1 \ldots k^U, n=1 \ldots N)$ $$\sum_{r=1}^{R}\sum_{k=1}^{K^g,u}\sum_{n=1}^{N} o_r^n f_{r,k,n}^{B/U} \leq T^{BADM/UADM} \tag{2-10}$$

-continued $$2\sum_{p=1}^{P}\sum_{lp=1}^{Lp} g_{lp}^n c_{lp} \leq \mu^{xc} e^{xc} (n \in H) \tag{2-11}$$

$$\sum_{n=1}^{N} e_n^{xc} \leq T^{xc} \tag{2-12}$$

$0 \leq c_{lp} \leq v_p, d_{r,k}^{B/U} = 0/1, u_{r,n,m}^{k,\omega,ct} = 0/1, b_{r,n,m}^k \geq 0, 0 \leq e_n^{xc} \leq E^{xc}$ The formula (2-1) shows the total cost to be minimized. The first term represents the cost regarding the fiber 7 in a bi-directional ring system 8 to be installed. The second term represents the cost regarding the fiber 7 in a uni-directional ring system 9 to be installed. The third term represents the cost regarding ADMs in a bi-directional ring system 8 to be installed. The fourth term represents the cost regarding ADMs in a uni-directional ring system 9 to be installed. The fifth term represents the cost regarding the XC 5 to be installed to each hub.

The formula (2-2) is a constraint formula for insuring that the sum of capacities allocated to node base paths to be used by each demand pair 11 is not smaller than the capacity required across the demand pair 11, to each demand pair 11. The formula (2-3) is a constraint formula for insuring that the total number of channels 10 is not smaller than the sum of capacities allocated to the node base path 43 routing the adjacent nodes. In this case, the channels 10 routes each of the bi-directional ring system 8 and the unidirectional ring system 9 installed to a ring candidate 3. The ring candidate 3 contains adjacent nodes that exist in at least one route for each path candidate settable to each demand pair 11.

The first term of the right side represents the total number of channels 10 with allocated slot numbers on clockwise and counterclockwise routes between the adjacent nodes in each bi-directional ring system 8 installed to a ring candidate 3. The second term of the right side represents the total number of channels 10 routing each uni-directional ring system 9. This constraint formula is set to at least one group of adjacent nodes existing in a candidate route for an arbitrary node base path 43.

The formula (2-4) is a constraint formula for insuring that the number of channels allocated with slot numbers in each span does not exceed 1, provided that the bi-directional ring system 8 is installed thereto, when the K-th bi-directional ring system 8 is installed to a ring candidate 3. The formula (2-5) is a constraint formula for insuring that the number of channels routing the ring system does not exceed the maximum channel multiplex number $\Omega$ when the k-th uni-directional ring system is installed to a ring candidate 3.

The formula (2-6) is a constraint formula for insuring that the (k+1)-th bi-directional ring system 8 or greater is not installed if the k-th bidirectional ring system 8 or for insuring that the (k+1)-th uni-directional ring system 9 or greater is not installed if the k-th uni-directional ring system 9 is not installed. Addition of the constraint formula (2-6) to the problem 2 does not more adversely affect the optimum value of the objective function. The constraint formula (2-6) can advantageously reduce the solution search range when the integer programming method is solved using the branch restricting method.

The formula (2-7) is a constraint formula for insuring that the total number of fibers 7 used in each span 2 does not exceeds its upper limit. The first term of the left side represents the total number of fibers used in the bi-directional ring system 8. The second term of the left side represents the total number of fibers used in the bi-directional ring system 9. In this example, one bi-directional ring system 8 uses 4 fibers in a span 2, as shown in FIG. 11. One uni-directional ring system 9 uses 2 fibers in a span 2, as shown in FIG. 14.

The formula (2-8) is a constraint formula for insuring that when the total number of channels branched from and inserted at each node 1 is 1 or more in each bi-directional ring system 8 installed to a ring candidate 3, ADMs for the bi-directional ring system 8 are installed. The formula (2-9) is a constraint formula for insuring that when the total number of channels branched from and inserted at each node 1 is 1 or more in each uni-directional ring system 9 installed to a ring candidate 3, ADMs for the uni-directional ring system 9 are installed.

The formula (2-10) is a constraint formula for insuring that the total number of ADMs within a bi-directional ring system does not exceeds the upper limit and that the total number of ADMs within a uni-directional ring system does not exceeds the upper limit. The formula (2-11) is a constraint formula for insuring that the total number of channels relayed by or terminated at each hub 12 does not exceed the sum of capacities of XC units installed to the hub 12. The formula (2-12) is a constraint formula for insuring that the total number of XC units within a network does not exceeds the upper limit.

Figure 1:
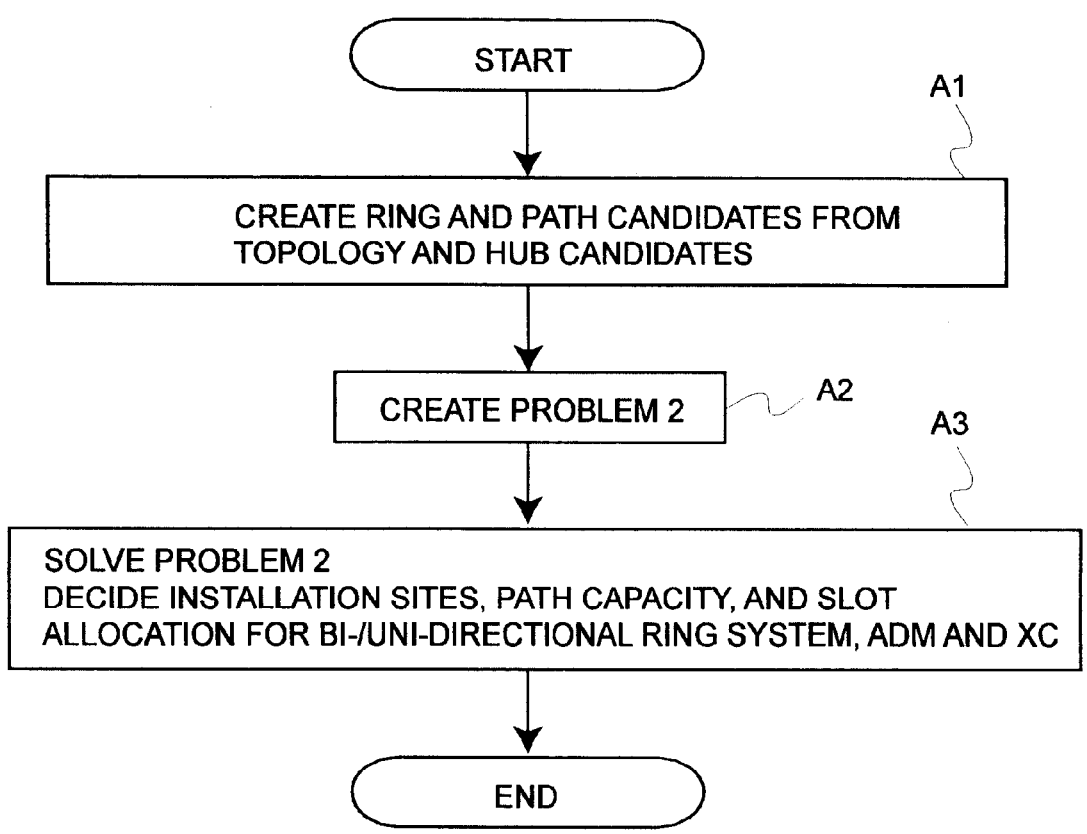
FIG. 1 is a flowchart illustrating the operation of a network according to a first embodiment of the present invention.

The first embodiment according to the present invention will be described below with reference to FIG. 1. First, a ring candidate 3 that can accommodate a ring system is created by a topology representing the connection status between the node 1 and the span 2 in a network and by a hub candidate 12 being a node 1 that can accommodate a XC unit, of nodes 1. A candidate route for the node base path 43 to which the demand pair 11 can be used is created (step A1l). Next, the problem 2 is created by deciding respective indicators in the items 1, 3 and 4 of FIG. 3 based on the ring candidate 3 obtained in the step A1 and by deciding respective indicators in the items 2 and 3 of FIG. 3 based on the route for the candidate node base path 43 (step A2).

The problem 2 is solved according to the branch restricting method. This process decides the number of bi-directional ring systems 8 to be installed to a candidate ring 3, the number of uni-directional ring systems 9 to be installed to a candidate ring 3, the node 1 in which the ADM 6 is installed to a ring system, the number of XC units to be installed to each hub 12, the capacity allocated to each node base span 43, and a slot number allocated to a channel routing within a bi-directional ring system 8 (step A3).

The integer problem programming method is well known in public. The typical method is a branch restricting method, disclosed in detail in "Model Building in Mathematical Programming", third edition reversed, by H. P. Williams, John Wiley & Suns. The branch restricting method will be briefly described below.

First, terms used in the branch restricting method are explained here. The prerequisite is to minimize the objective function. The problem in which all integer variables in an integer programming problem are relaxed in real part variables is called a linear relaxation problem to an original problem. When all resolutions (a set of all variables) of a given linear relaxation problem are not integers, one variable not an integer is selected. A new linear relaxation problem is created by adding the constraint formula representing that the variable is smaller than the integer component of the value or that the variable is larger than (the integer component of the value +1), to the original linear relaxation problem. This process is called a branch (or multipoint) operation.

A new node is decided by corresponding to a linear relaxation problem to one node and then by creating a new linear relaxation program through the branch operation. This process is called branch extension. The original node is called an ancestral node with respect to the node where an extended branch reaches. The graph of branches created through repeated branch operations is called a search tree.

In the linear relaxation problem, the solution satisfying the constraint is called a feasible solution. The feasible solution providing an optimum value is called an optimum solution. When the linear relaxation problem corresponding to a node does not have a feasible solution, there are no feasible solutions even if the branch is further extended from the node. The node does not extend the branch any more. Such a node is called a terminated node. It is assumed that an optimum value is obtained by solving a linear relaxation problem corresponding to a node and is not better than an objective function value (hereinafter simply referred to as a palliative value) to an integer solution provisionally obtained until now. In this case, a better optimum value cannot be obtained even if the constraint formula is added through a further repeated branch operation. As a result, the node is terminated. This procedure is called a restrictive operation.

In the branch operation, since either one of two foregoing inequalities is added to the original linear relaxation problem, there are two branching directions. The node not terminated and not branched in two ways is a branch operational node and is called an active node. The minimum one of optimum values of the linear relaxation problem to all active nodes does not make the palliative value smaller and is called the best lower bound of the integer programming problem. Solutions providing optimum values, of which all variable values are integers, are called integer solutions.

Next, the algorithm in the branch restricting method according to an embodiment will be explained below using the above-mentioned terms, with reference to the flowchart of FIG. 5. First, the palliative value Z is set to infinity (step S1). The linear relaxation problem (LP) corresponding to a selected node is solved (step S2). It is checked whether a feasible solution has been obtained (step S3). When a feasible solution is obtained in the step S3, it is checked whether the optimum value is larger than the palliative value (step S4). When the optimum value is not larger than the palliative value in the step 4, it is checked whether an integer solution has been obtained (step S5). When an integer solution is not obtained in the step S5, one node is selected through the branch operation (step S6).

Next, it is checked whether the ancestral node has completely branched in two ways (step S7). If the ancestral node is not terminated, the flow goes to the step S2. When the ancestral node has completely branched in the step 7, it is terminated to update the best lower bound (step S8). Then the flow goes to the step 2.

When a feasible solution cannot be obtained in the step S3, the node is terminated (step 9). Next, it is checked whether there is at least one active node in the search tree (step A10). If no active node is left, the solution providing the palliative value is set to an optimum integer solution. Thus the step S15 is ended by setting the palliative value as an optimum value of the integer programming problem.

When an active node is left in the step S10, the best lower bound is updated (step S11). Then the flow goes to the step S6. When the optimum value of the linear relaxation problem exceeds the palliative value in the step S4, the flow goes to the step S9. When the solution of the linear relaxation problem is an integer solution in the step S5, the palliative value is updated with the optimum value of the linear relaxation problem and all active nodes with an optimum value smaller than the updated value are terminated. Thus, the best lower bound is updated (step S12). Next, it is checked whether the palliative value is sufficiently close to the best lower bound (step S13). If the palliative value is close to the best lower bound, the step S14 is ended by setting the solution providing the palliative value as a quasi optimum integer solution and by setting the palliative value as a quasi optimum value. When the palliative value is sufficiently close to the best lower bound in the step S13, the flow goes to the step S6.

In a modification of the first embodiment, let us consider the case where the XC does not perform the slot number conversion. The variables are defined according to the items 1 and 2 shown in FIG. 6.

The formulas (2-2), (2-3),.(2-5), (2-9), and (2-11) in the problem 2 are respectively substituted for the following formulas. (formula 3)

$$\sum_{\omega=1}^{\Omega}\sum_{lp=1}^{Lp} C_{lp}^{\omega} \geq vp (p = 1 \ldots P) \tag{2-2'}$$

$$\sum_{p=1}^{P}\sum_{lp=1}^{Lp}\sum_{k(lp)=1}^{H(lp)} \delta_{k(lp)}^{n,m} c_{lp}^{\omega} \leq \sum_{r=1}^{R}\sum_{k=1}^{k^g}\sum_{ct=(cw,ct)} o_r^n o_r^m u_{r,n,m}^{k,\omega,ct} + \sum_{r=1}^{R}\sum_{k=1}^{k^u} b_{r,n,m}^{U,\omega} \tag{2-3'}$$

$$((n, m) \in Q, \omega = 1 \ldots \Omega)$$

$$\sum_{(n,m)\in P} b_{r,n,m}^{k,\omega} \leq d_{r,k}^{U} (r = 1 \ldots R, k = 1 \ldots k^U, \omega = 1 \ldots \Omega) \tag{2-4'}$$

$$\sum_{ct=(cw,ct)}\sum_{(n,m)\in Q, n\langle m}\sum_{\omega=1}^{\Omega} o_r^n o_r^m b_{r,m,n}^{k,\omega} + \tag{2-9'}$$

$$\sum_{ct=(cw,ct)}\sum_{(n,m)\in Q, n\langle m}\sum_{\omega=1}^{\Omega} o_r^n o_r^m b_{r,m,n}^{k,\omega} \leq \Omega f_{r,k,n}^{U}$$

$$(r = 1 \ldots R, k = 1 \ldots K^U, n = 1 \ldots N)$$

$$2\sum_{p=1}^{P}\sum_{lp=1}^{Lp}\sum_{\omega=1}^{} g_{lp}^n c_{lp}^{\omega} \leq \mu^{xc} e_n^{xc} (n \in H) \tag{2-11'}$$

The formula (2-2') is a constraint formula for insuring that the sum of capacities allocated to slots in each node base path 43 used by each demand pair 11 is smaller than a capacity required across the demand pair 11. The formula (2-3') is a constraint formula for insuring that the sum of capacities allocated to slot numbers of an adjacent node base path 43 on the route of at least one node base path 43 exceeds the number of channels allocated with slot numbers and routing the bi-directional ring system 8 or the uni-directional ring system 9 installed to a candidate ring 3.

The formula (2-5') is a constraint formula for insuring that when the unit-directional ring system 9 is installed to each candidate ring 3, the number of channels routing across each node pair on each uni-directional ring system 9 allocated to each slot number is 1 at most.

The formula (2-9') is a constraint formula insuring that a slot number is allocated to the node 1 containing a candidate ring 3 in each uni-directional ring system installed to each candidate ring 3 and that provided that one channel is to be branched and inserted, an ADM for the unit-directional ring system 9 is installed to the channel.

The formula (2-11') is a constraint formula for insuring that the sum of total numbers of channels relayed or terminated, with a slot number allocated at each hub 12, does not exceed the sum of capacities of the XCs allocated to the hub 12.

The second embodiment of the present invention relates to the formulation in the case where only the bi-directional ring system can be installed. In this case, the following problem 3 is obtained by deleting variables related to the uni-directional ring system from the objective function and the constraint formula in the problem 2.

Problem 3:
(formula 4)

$$\text{Minimize } 4\sum_{r=1}^{R}\sum_{k=1}^{Kg}\sum_{s=1}^{S} a_s g_r^s d_{r,k}^B + \tag{3-1}$$

$$r^{BADM}\sum_{r=1}^{R}\sum_{k=1}^{Kg}\sum_{n=1}^{N} g_r^n f_{r,k,n}^B + r^{xc}\sum_{n=1}^{N} e_n^{xc}$$

$$\text{subject to } \sum_{lp=1}^{Lp} c_{lp} \geq vp \; (p = 1 \ldots P) \tag{3-2}$$

$$\sum_{p=1}^{P}\sum_{lp=1}^{Lp}\sum_{k(lp)=1}^{H(lp)} \delta_{k(lp)}^{n,m} c_{lp} \leq \tag{3-3}$$

$$\sum_{r=1}^{R}\sum_{k=1}^{K^S}\sum_{\omega=1}^{\Omega}\sum_{ct=(cw,ct)} o_r^n o_r^m u_{r,k,\omega}^{n,m,ct} + ((n, m) \in Q)$$

$$\sum_{ct=(cw,ct)}\sum_{(n,m)\in Q} g_{r,n,m}^{ct} u_{r,n,m}^{k,\omega,ct} \leq d_{r,k}^B \tag{3-4}$$

$$(r = 1 \ldots R, k = 1 \ldots K^B, s = 1 \ldots S, \omega = 1 \ldots \Omega s \cdot t \cdot g_s^r = 1)$$

$$d_{r,k}^B \geq d_{r,k+1}^B \; (r = 1 \ldots R, k = 1 \ldots K^B - 1) \tag{3-5}$$

$$\sum_{n=1}^{N} e_n^{xc} \leq T^{xc} \tag{3-10}$$

$$0 \leq c_{lp} \leq v_p, d_{r,k}^{B/U} = 0/1, u_{r,n,m}^{k,\omega,ct} = 0/1, 0 \leq e_n^{xc} \leq E^{xc}$$

$$4\sum_{r=1}^{R}\sum_{k=1}^{K^S} g_r^S d_{r,k}^B \leq D \; (s = 1 \ldots S) \tag{3-6}$$

$$\sum_{\omega=1}^{\Omega}\sum_{ct=(cw,ct)}\sum_{(n,m)\in Qn\langle m} o_r^n o_r^m u_{r,m,n}^{k,\omega,ct} + \tag{3-7}$$

$$\sum_{\omega=1}^{\Omega}\sum_{ct=(cw,ct)}\sum_{(n,m)\in Qm\langle n} o_r^n o_r^m u_{r,m,n}^{k,\omega,ct} \leq 2\Omega f_{r,k,n}^B$$

$$(r = 1 \ldots R, k = 1 \ldots K^B, n = 1 \ldots N)$$

$$\sum_{r=1}^{R}\sum_{k=1}^{Kg,u}\sum_{n=1}^{N} o_r^n f_{r,k,n}^B \leq T^{BADM} \tag{3-8}$$

$$2\sum_{p=1}^{P}\sum_{lp=1}^{Lp} g_{lp}^n c_{lp} \leq \mu^{xc} e_n^{xc} (n \in H) \tag{3-9}$$

Figure 7:
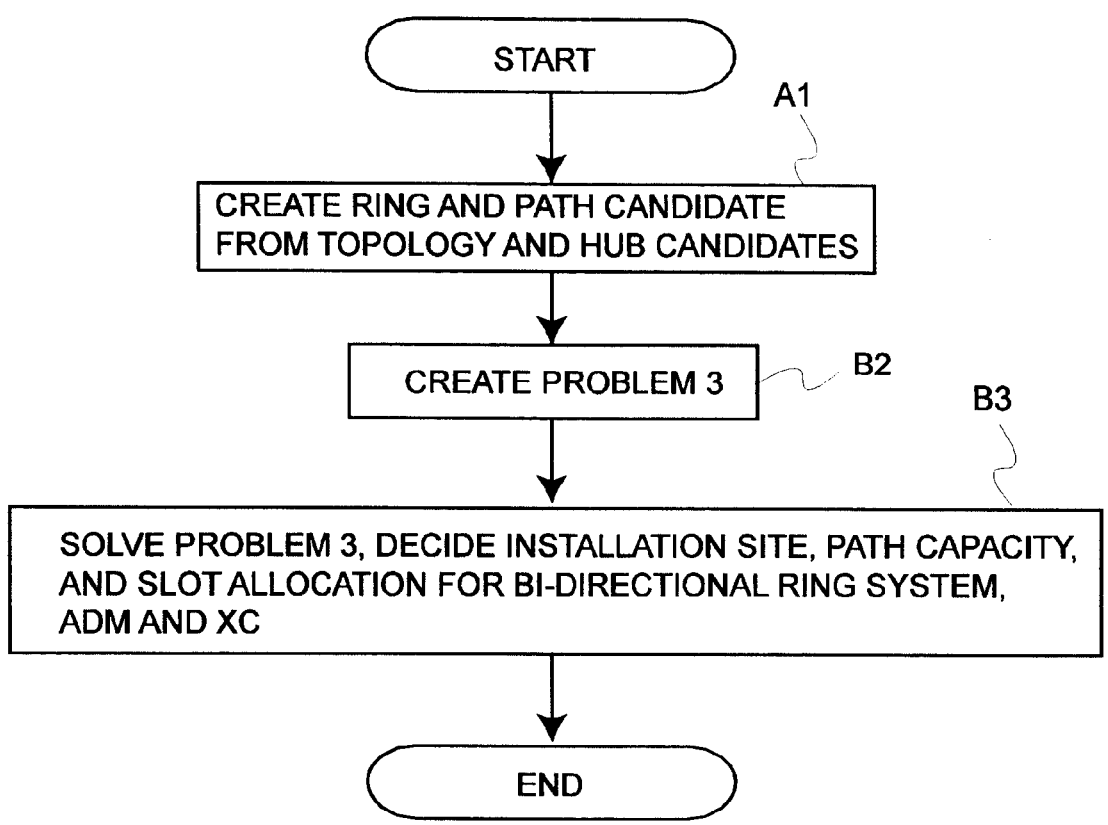
FIG. 7 is a flowchart illustrating the operation of a network according to a second embodiment of the present invention.
Figure 9:
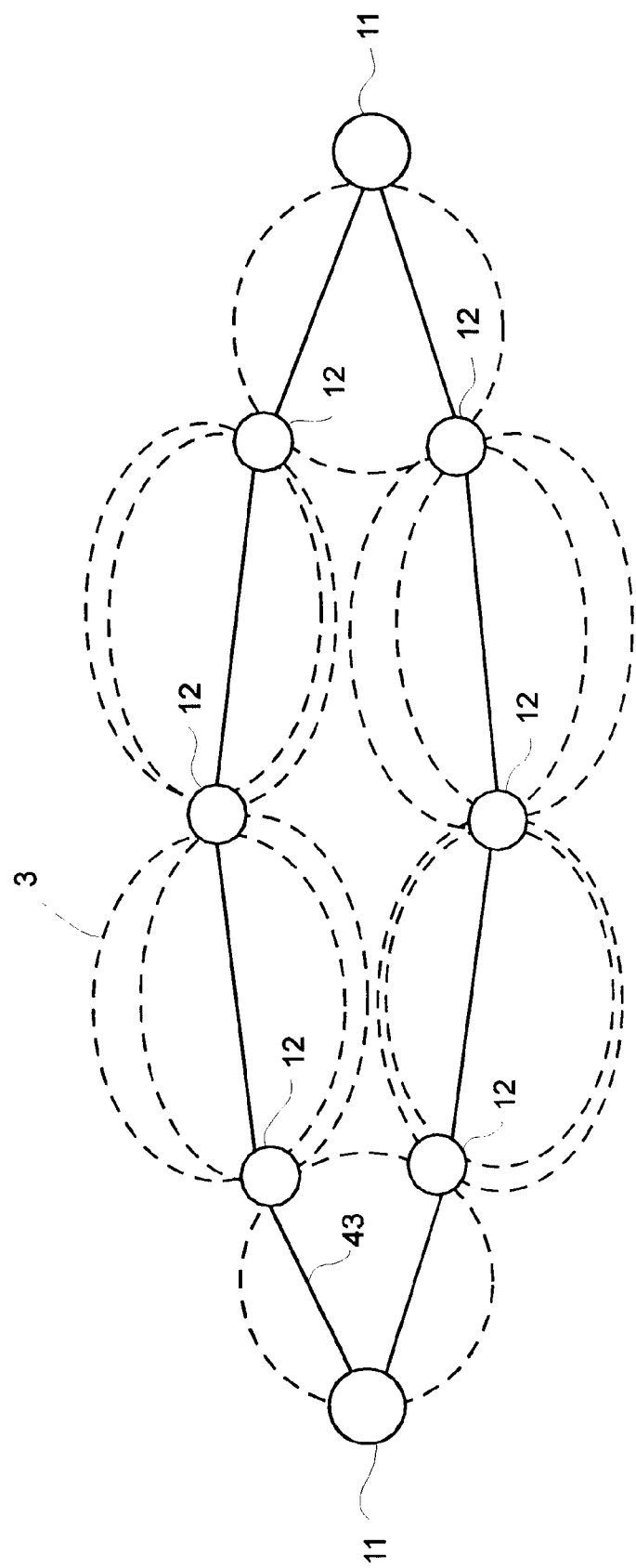
FIG. 9 is a schematic diagram explaining the route setting method according to the present invention.
Figure 10:
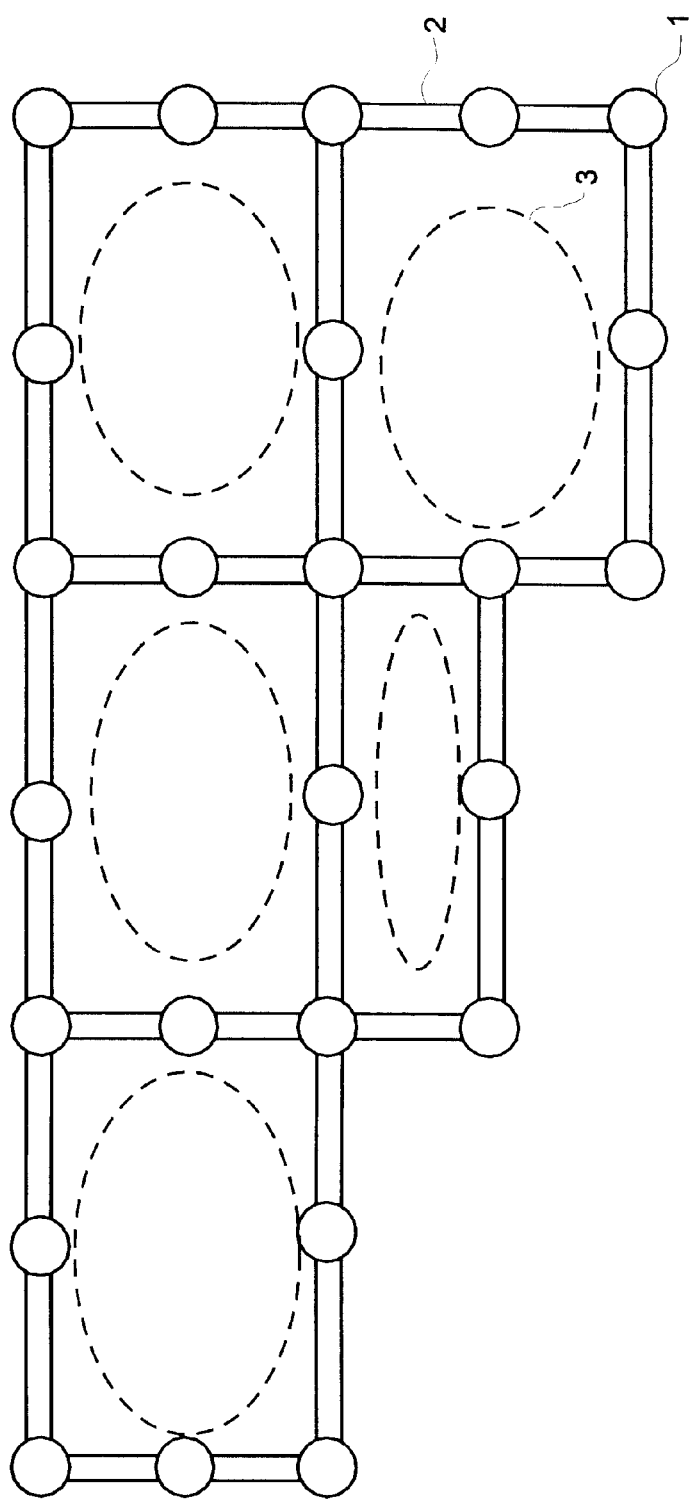
FIG. 10 is a diagram representing the connection relationships between nodes and spans in a network.

The second embodiment will be described by referring to FIG. 7. First, a candidate ring 3 is created based on a connection relationships between nodes 1 and spans 2 in the network as well as hub candidates 12. A candidate route for the node base path 43 settable across the demand pair 11 is created (step A1).

Next, the problem 3 is created by deciding an indicator by the candidate ring 3 obtained in the step A1 and by deciding an indicator by the candidate route for the each node base path 43 (step B2). Finally, the problem 3 is solved using the branch restricting method. Thus, the number of bidirectional ring systems 8 to be installed to each candidate ring 3, the node 1 to which an ADM is installed to each ring system, the number of XCs to be installed to each hub 12, the capacity allocated to each node base path 43, and slots to be allocated to the channel routing the bi-directional ring system 8 are decided (step B3).

Like the modification of the first embodiment, the modification of the second embodiment relates to the case where the XC does not perform the slot number conversion. The formula (3-2) is substituted for the following formula (3-2'). The formula (3-3) is substituted for the following formula (3-3'). The formula (3-9) is substituted for the following formula (3-9').
(formula 5)

$$\sum_{\omega=1}^{\Omega} \sum_{lp=1}^{Lp} c_{lp}^{\omega} \geq v_p \ (p = 1 \ldots P) \quad (3\text{-}2')$$

$$\sum_{p=1}^{P} \sum_{lp=1}^{Lp} \sum_{k(lp)=1}^{H(lp)} \delta_{k(lp)}^{n,m} c_{lp}^{\omega} \geq \sum_{r=1}^{R} \sum_{k=1}^{Kg} \sum_{ct=(cw,ct)} o_r^n o_r^m u_{r,n,m}^{k,\omega,ct} \quad (3\text{-}3')$$

$$((n, m) \in Q, \omega = 1 \ldots \Omega)$$

$$2\sum_{p=1}^{P} \sum_{lp=1}^{Lp} \sum_{\omega=1} g_{lp}^n c_{lp} \leq \mu^{xc} e_n^{xc} (n \in H) \quad (3\text{-}9')$$

Next, the third embodiment of the present invention will be described below. Even if a path containing a failed hub acting as a transit node is adversely affected by the failure, previously allocating an extra capacity to the span 4, not being affected by the hub failure, allows the capacity required in each demand pair to be reserved. For this operation, Symbols are defined in the items 1 and 2, as shown in FIG. 8.

The following formula is added to the problems 2 and 3.
(formula 6)

$$\sum_{lp=1}^{Lp} (1 - \pi_{lp}^n) c_{lp} \geq v_p \ (p = 1 \ldots P, n \in Np) \quad (4\text{-}2)$$

In the inequality (4-2), the inner term of 2 of the left side represents that the capacity C1p is allocated to the path 1p, not including the node n as a transit node, when a node n is in a failure state and that a capacity of 0 is allocated to the path 1p, including the node n as a transit node, when a node n is in a failure state. In order to make the constraint effective, two paths, which are arbitrarily selected from node base path candidates 43 usable by respective command pairs, do not include the same hub 12 as a transit node to each other.

In the present invention, the first advantage is that the design results are directly applicable to actual ring system operations. The reason is that the network can immediately decide nodes, to which ADMs are installed, and slot allocation to channels routing between nodes in a bi-directional ring system to be installed to each ring. Moreover, a uni-directional ring system to be installed to each ring sets an integer programming problem which contains variables for deciding the number of channels routing between nodes. Hence, based on the selected solution, the network can immediately decide the slot number to be allocated to a channel routing each bi-directional ring system as well as the channel setting between nodes in each uni-directional ring system.

The second advantage is that the design can be performed to optimize the total costs including costs regarding XCs and ADMs. The reason is that the path candidate route is considered based on the arrangement of nodes being demand pairs or hubs. Hence, the network can introduce variables representing the number of XCs to be installed to each hub, XC related costs to the objective function, and conditions regarding the path accommodation of the XC to the constraint formula.

When plural bi-directional ring systems or uni-directional ring systems are installed to each ring candidate, each ring system can specify the node to which an ADM for branching and insertion channels is installed.

The third advantage is that the capacity for each demand pair can be satisfied even in an occurrence of hub failure. The reason is that the design problem is set and solved, including the constraint formula (4-2) allocating an extra capacity to each path in previous consideration of failure.

The entire disclosure of Japanese Application No. 10-179919 filed Jun. 26, 1999 including specification, claims, and summary are incorporated herein by reference entirely.

What is claimed is:

1. A network designing method, comprising the steps of:

providing a route for each of path candidates installable between demand pairs by means of connection relationships between nodes and spans in a network, a demand pair being a terminal terminating node, and a hub being a node to which a cross connect unit is installable, based on ring candidates on which a bi-directional ring system or unidirectional ring system is installable and an arrangement of rings contained in said demand pair and said hub;

creating an integer programming problem containing at least a first variable, a second variable, a third variable, a fourth variable, a fifth variable, a sixth variable, a seventh variable, a first constraint, a second constraint, a third constraint, a fourth constraint, and a fifth constraint;

said first variable representing a capacity allocated to each of the paths;

said second variable representing whether a k-th bi-directional ring system is installed to a r-th ring candidate;

said third variable representing whether an add drop multiplexer is installed, wherein said add drop multiplexer branches and inserts said channel from said k-th bi-directional ring system which is installed to said r-th ring candidate, in said node contained in said r-th ring candidate;

said fourth variable representing whether said channel, to which a slot number is allocated, is routed on clockwise route or counterclockwise route between respective adjacent nodes, said adjacent nodes being contained in the r-th ring candidate and in at least one of said path candidates to said demand pair in said k-th bi-directional ring system installed to said r-th ring candidate;

said fifth variable representing whether said k-th uni-directional ring system is installed to said r-th ring candidate;

said sixth variable representing whether an add drop mulitplexer is installed, said add drop multiplexer branching and inserting said channel from said k-th uni-directional ring system installed to said r-th ring candidate in said node contained in said r-th ring candidate;

said seventh variable representing the number of channels to be routed between respective adjacent nodes contained in said r-th ring candidate and in at least one of routes for said path candidates to said demand pair in said k-th uni-directional ring system installed to said r-th ring candidate;

said first constraint representing that the total number of channels is smaller than the total number of capacities allocated to all paths routing said adjacent nodes, said channels routing said bi-directional systems and said unidirectional systems installed to each of said ring candidates containing said adjacent nodes in respective adjacent nodes existing on at least one of routes for said path candidates;

said second constraint representing that when said k-th bi-directional ring system is installed to said r-th ring candidate, the number of passable channels to which slots are allocated in respective spans contained in said r-th ring candidate is only one of all clockwise or counterclockwise routes routing said span, said routes existing in adjacent nodes contained in said r-th ring candidate or in at least one route of said path candidates to said demand pair;

said third constraint representing that when said k-th uni-directional ring system is installed to said r-th ring candidate, the total number of channels routing between adjacent nodes contained in said r-th ring candidate and in at least one route of said path candidates to said demand pair does not exceed the total number of slots per fiber;

said fourth constraint representing that when an add drop mulitplexer is installed to each of nodes contained in said r-th ring of said k-th bi-directional ring system installed to said r-th ring candidate, the total number of channels to be branched and inserted in each node does not exceed twice the total number of channels per fiber;

said fifth constraint representing that when an add drop multiplexer is installed to each of nodes contained in said r-th ring of said k-th unidirectional ring system installed to said r-th ring candidate, the total number of channels to be branched and inserted in each node does not exceed the total number of channels per fiber; and deciding the number of said bi-directional ring systems to be installed to said ring candidate based on a solution of said integer programming problem, the number of said uni-directional ring systems to be set to said ring candidate based on a solution of said integer programming problem, a node to which said add drop multiplexer is installed in each bi-directional ring system, and a slot number allocated to a channel routing said bi- and uni-directional ring systems to be installed.

2. A network designing method, comprising the steps of:

providing a route for each of path candidates installable between demand pairs by means of connection relationships between nodes and spans in a network, a demand pair being a terminal terminating node, and a hub being a node to which a cross connect unit is installable, based on ring candidates on which a bi-directional ring system or unidirectional ring system is installable and an arrangement of rings contained in said demand pair and said hub;

creating an integer programming problem containing at least a first variable, a second variable, a third variable, a fourth variable, a first constraint, a second constraint, and a third constraint;

said first variable representing a capacity allocated to each of the paths;

said second variable representing whether a k-th bi-directional ring system is installed to a r-th ring candidate;

said third variable representing whether an add drop multiplexer is installed, wherein said add drop multiplexer branches and inserts said channel from said k-th bi-directional ring system which is installed to said r-th ring candidate, in said node contained in said r-th ring candidate;

said fourth variable representing whether said channel, to which a slot number is allocated, is routed on clockwise route or counterclockwise route between respective adjacent nodes, said adjacent nodes being contained in the r-th ring candidate and in at least one of said path candidates to said demand pair in said k-th bi-directional ring system installed to said r-th ring candidate;

said first constraint representing that the total number of channels is smaller than the total number of capacities allocated to all paths routing said adjacent nodes, said channels routing said bidirectional systems and said uni-directional systems installed to each of said ring candidates containing said adjacent nodes in respective adjacent nodes existing on at least one of routes for said path candidates;

said second constraint representing that when said k-th bi-directional ring system is installed to said r-th ring candidate, the number of passable channels to which slots are allocated in respective spans contained in said r-th ring candidate is only one of all clockwise or counterclockwise routes routing said span, said routes existing in adjacent nodes contained in said r-th ring candidate or in at least one route of said path candidates to said demand pair;

said third constraint representing that when an add drop mulitplexer is installed to each of nodes contained in said r-th ring of said k-th bi-directional ring system installed to said r-th ring candidate, the total number of channels to be branched and inserted in each node does not exceed twice the total number of channels per fiber; and deciding the number of said bi-directional ring systems to be installed to said ring candidate based on a solution of said integer programming problem, a node to which said add drop multiplexer is installed in said bi-directional ring system, and a slot number allocated to a channel routing said bi-directional ring system to be installed.

3. The network designing method defined in claim 1, wherein said integer programming problem contains a constraint under which the capacity allocated to a path containing hubs on a route is 0, each of said hubs being contained as a transit node in at least one path candidate in which said demand pair can be used and under which the sum of capacities allocated to respective path candidates of said demand pair is smaller than a required capacity of said demand pair.

4. The network designing method defined in claim 2, wherein said integer programming problem contains a constraint under which the capacity allocated to a path containing hubs on a route is 0, each of said hubs being contained as a transit node in at least one path candidate in which said demand pair can be used and under which the sum of capacities allocated to respective path candidates of said demand pair is smaller than a required capacity of said demand pair.

5. A recording medium on which a program is recorded for executing a network designing method by a computer, said program comprising the steps of:

providing a route for each of path candidates installable between demand pairs by means of connection relationships between nodes and spans in a network, a demand pair being a terminal terminating node, and a hub being a node to which a cross connect unit is installable, based on ring candidates on which a bidirectional ring system or uni-directional ring system is installable and an arrangement of rings contained in said demand pair and said hub;

creating an integer programming problem containing at least a first variable, a second variable, a third variable, a fourth variable, a fifth variable, a sixth variable, a seventh variable, a first constraint, a second constraint, a third constraint, a fourth constraint, and a fifth constraint;

said first variable representing a capacity allocated to each of the paths;

said second variable representing whether a k-th bi-directional ring system is installed to a r-th ring candidate;

said third variable representing whether an add drop multiplexer is installed, wherein said add drop multiplexer branches and inserts said channel from said k-th bi-directional ring system which is installed to said r-th ring candidate, in said node contained in said r-th ring candidate;

said fourth variable representing whether said channel, to which a slot number is allocated, is routed on clockwise route or counterclockwise route between respective adjacent nodes, said adjacent nodes being contained in the r-th ring candidate and in at least one of said path candidates to said demand pair in said k-th bi-directional ring system installed to said r-th ring candidate;

said fifth variable representing whether said k-th uni-directional ring system is installed to said r-th ring candidate;

said sixth variable representing whether an add drop mulitplexer is installed, said add drop multiplexer branching and inserting said channel from said k-th uni-directional ring system installed to said r-th ring candidate in said node contained in said r-th ring candidate;

said seventh variable representing the number of channels to be routed between respective adjacent nodes contained in said r-th ring candidate and in at least one of routes for said path candidates to said demand pair in said k-th uni-directional ring system installed to said r-th ring candidate;

said first constraint representing that the total number of channels is smaller than the total number of capacities allocated to all paths routing said adjacent nodes, said channels routing said bi-directional systems and said uni-directional systems installed to each of said ring candidates containing said adjacent nodes in respective adjacent nodes existing on at least one of routes for said path candidates;

said second constraint representing that when said k-th bi-directional ring system is installed to said r-th ring candidate, the number of passable channels to which slots are allocated in respective spans contained in said r-th ring candidate is only one of all clockwise or counterclockwise routes routing said span, said routes existing in adjacent nodes contained in said r-th ring candidate or in at least one route of said path candidates to said demand pair;

said third constraint representing that when said k-th uni-directional ring system is installed to said r-th ring candidate, the total number of channels routing between adjacent nodes contained in said r-th ring candidate and in at least one route of said path candidates to said demand pair does not exceed the total number of slots per fiber;

said fourth constraint representing that when an add drop mulitplexer is installed to each of nodes contained in said r-th ring of said k-th bi-directional ring system installed to said r-th ring candidate, the total number of channels to be branched and inserted in each node does not exceed twice the total number of channels per fiber;

said fifth constraint representing that when an add drop multiplexer is installed to each of nodes contained in said r-th ring of said k-th uni-directional ring system installed to said r-th ring candidate, the total number of channels to be branched and inserted in each node does not exceed the total number of channels per fiber; and deciding the number of said bi-directional ring systems to be installed to said ring candidate based on a solution of said integer programming problem, the number of said uni-directional ring systems to be set to said ring candidate based on a solution of said integer programming problem, a node to which said add drop multiplexer is installed in each bi-directional ring system, and a slot number allocated to a channel routing said bi- and uni-directional ring systems to be installed.

6. A recording medium on which a program is recorded for executing a network designing method by a computer, said program comprising the steps of:

providing a route for each of path candidates installable between demand pairs by means of connection relationships between nodes and spans in a network, a demand pair being a terminal terminating node, and a hub being a node to which a cross connect unit is installable, based on ring candidates on which a bidirectional ring system or uni-directional ring system is installable and an arrangement of rings contained in said demand pair and said hub;

creating an integer programming problem containing at least a first variable, a second variable, a third variable, a fourth variable, a first constraint, a second constraint, and a third constraint;

said first variable representing a capacity allocated to each of the paths;

said second variable representing whether a k-th bi-directional ring system is installed to a r-th ring candidate;

said third variable representing whether an add drop multiplexer is installed, wherein said add drop multiplexer branches and inserts said channel from said k-th bi-directional ring system which is installed to said r-th ring candidate, in said node contained in said r-th ring candidate;

said fourth variable representing whether said channel, to which a slot number is allocated, is routed on clockwise route or counterclockwise route between respective adjacent nodes, said adjacent nodes being contained in the r-th ring candidate and in at least one of said path candidates to said demand pair in said k-th bi-directional ring system installed to said r-th ring candidate;

said first constraint representing that the total number of channels is smaller than the total number of capacities allocated to all paths routing said adjacent nodes, said channels routing said bi-directional systems and said uni-directional systems installed to each of said ring candidates containing said adjacent nodes in respective adjacent nodes existing on at least one of routes for said path candidates;

said second constraint representing that when said k-th bi-directional ring system is installed to said r-th ring candidate, the number of passable channels to which slots are allocated in respective spans contained in said r-th ring candidate is only one of all clockwise or counterclockwise routes routing said span, said routes existing in adjacent nodes contained in said r-th ring candidate or in at least one route of said path candidates to said demand pair;

said third constraint representing that when an add drop mulitplexer is installed to each of nodes contained in said r-th ring of said k-th bi-directional ring system installed to said r-th ring candidate, the total number of channels to be branched and inserted in each node does not exceed twice the total number of channels per fiber; and deciding the number of said bi-directional ring systems to be installed to said ring candidate based on a solution of said integer programming problem, a node to which said add drop multiplexer is installed in said bi-directional ring system, and a slot number allocated to a channel routing said bi-directional ring system to be installed.

7. The recording medium defined in claim 5, wherein said integer programming problem contains a constraint under which the capacity allocated to a path containing hubs on a route is 0, each of said hubs being contained as a transit node in at least one path candidate in which said demand pair can be used and under which the sum of capacities allocated to respective path candidates of said demand pair is smaller than a required capacity of said demand pair.

8. The recording medium defined in claim 6, wherein said integer programming problem contains a constraint under which the capacity allocated to a path containing hubs on a route is 0, each of said hubs being contained as a transit node in at least one path candidate in which said demand pair can be used and under which the sum of capacities allocated to respective path candidates of said demand pair is smaller than a required capacity of said demand pair.

\* \* \* \* \*